(12) United States Patent
Uchida

(10) Patent No.: US 8,077,276 B2
(45) Date of Patent: Dec. 13, 2011

(54) DISPLAY SYSTEM

(75) Inventor: Hideki Uchida, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1825 days.

(21) Appl. No.: 10/549,584

(22) PCT Filed: Feb. 18, 2004

(86) PCT No.: PCT/JP2004/001845
§ 371 (c)(1),
(2), (4) Date: Sep. 14, 2005

(87) PCT Pub. No.: WO2004/081642
PCT Pub. Date: Sep. 23, 2004

(65) Prior Publication Data
US 2006/0203154 A1  Sep. 14, 2006

(30) Foreign Application Priority Data
Mar. 14, 2003  (JP) ................. 2003-070193

(51) Int. Cl.
*G02F 1/1335* (2006.01)
*G02F 1/133* (2006.01)
(52) U.S. Cl. ..................... 349/114; 349/116
(58) Field of Classification Search ........... 349/116, 349/114
See application file for complete search history.

(56) References Cited

U.S. PATENT DOCUMENTS

| | | | |
|---|---|---|---|
| 5,635,729 A | 6/1997 | Griessen et al. | |
| 6,259,853 B1 | 7/2001 | Chen et al. | |
| 6,295,109 B1 | 9/2001 | Kubo et al. | |
| 6,317,531 B1 | 11/2001 | Chen et al. | |
| 2002/0039224 A1* | 4/2002 | Johnson et al. | 359/245 |
| 2004/0021809 A1 | 2/2004 | Sumiyoshi et al. | |
| 2004/0155999 A1* | 8/2004 | Okumura et al. | 349/114 |

FOREIGN PATENT DOCUMENTS

| | | |
|---|---|---|
| EP | 1 081 538 A2 | 3/2001 |
| EP | 1 085 365 A2 | 3/2001 |
| JP | 62-071930 | 4/1987 |
| JP | 11-316382 | 11/1999 |
| JP | 2000-056294 | 2/2000 |

(Continued)

OTHER PUBLICATIONS

Huiberts et al., "Yttrium and Lanthanum Hydride Films with Switchable Optical Properties," Nature, Mar. 21, 1996, pp. 231-234, vol. 380.

(Continued)

*Primary Examiner* — Wen-Ying P Chen
(74) *Attorney, Agent, or Firm* — Keating & Bennett, LLP

(57) ABSTRACT

A display system according to the present invention includes: a dimming device capable of switchably presenting a light reflecting state or a light transmitting state; and a display device for displaying information by modulating light transmitted through the dimming device and/or light reflected by the dimming device. The dimming device has a plurality of regions each being independently capable of switchably presenting a light reflecting state or a light transmitting state, and, when a plurality of types of information are being displayed on the display device, the dimming device is capable of selectively switching between the light reflecting state or the light transmitting state of each of the plurality of regions in accordance with the types of information being displayed.

28 Claims, 14 Drawing Sheets

FOREIGN PATENT DOCUMENTS

| JP | 2000-321564 | 11/2000 |
|----|-------------|---------|
| JP | 2000-347184 | 12/2000 |
| JP | 2002-090782 | 3/2002 |
| JP | 2002-345149 | 11/2002 |
| WO | WO 98/08139 | 2/1998 |
| WO | WO 98/10329 | 3/1998 |
| WO | WO 00/63745 | 10/2000 |

OTHER PUBLICATIONS

Yoshimura et al., 31-a-ZS-14, "Optical Property of $Mg_2Ni$ Switchable Mirror Thin Films," Japan Society of Applied Physics, 2001 Spring Meeting, p. 993.

Von Rottkay et al., "Effect of Hydrogen Insertion on the Optical Properties of PD-Coated Magnesium Lanthanides," Third International Meeting on Electrochromics in London, England, Sep. 8, 1998, pp. 1-11.

Ouwerkerk, "Thin Film Electrochromic Device with Metal Hydride as Active Material Using Calcium Fluoride Hydride as a Hydrogen Conductor."

Kremers et al., "Optical Transmission Spectroscopy of Switchable Yttrium Hydride Films," Physical Review B, Feb. 15, 1998, vol. 57, No. 8, pp. 4943-4949.

Van Der Sluis et al., "Solid State Gd-Mg Electrochromic Devices with $ZrO_2H_y$ Electrolyte."

Uchida, "Dimming Device and Display Device Incorporating the Same," U.S. Patent Application filed on the same day as the present application.

* cited by examiner

Mirror Reflection ⇔ Transparent (a)

(b)

DISPLAY SYSTEM

BACKROUND OF THE INVENTION

1. Field of the Invention

The present invention relates to a display system, and particularly to a display system capable of displaying under a transmission mode using transmitted light and displaying under a reflection mode using reflected light.

2. Description of the Related Art

In recent years, liquid crystal display devices of reflection types are widely used as display devices of electronic devices for mobile purposes. A liquid crystal display device of a reflection type performs display by reflecting ambient light (external light), and therefore excels in terms of low power consumption, and is very suitable for outdoor displaying.

However, a mobile phone or a PDA (mobile information terminal) is put to a very wide range of uses, from outdoor to indoor, or from daytime to nighttime. Therefore, if a reflection type liquid crystal display device is employed, the mobile phone or PDA cannot be used in a situation where the ambient light is weak. Thus, there is a need for a display device which is capable of performing display regardless of whether the ambient light is strong or weak.

As such a display device, Japanese Laid-Open Patent Publication No. 11-316382 proposes a liquid crystal display device of a transmission/reflection dual-use type (hereinafter also referred to simply as "dual-use type"), such that a region in which light is reflected and a region in which light is transmitted are created within each pixel. In the region where light is reflected, this liquid crystal display device performs display under a reflection mode utilizing ambient light, and in the region where light is transmitted, performs display in a transmission mode utilizing light from a backlight. Hence, it is possible to perform display regardless of whether the ambient light is strong or weak. Therefore, such dual-use type liquid crystal display devices are mounted on mobile phones today, and are widely used.

However, in the conventional dual-use type liquid crystal display device proposed in Japanese Laid-Open Patent Publication No. 11-316382, supra, each pixel is divided into two regions which utilize light in different manners. Therefore, neither during display under the reflection mode nor during display under the transmission mode can a single entire pixel contribute to displaying. As a result, the display characteristics are not sufficient as compared to a conventional reflection-type liquid crystal display device or transmission-type liquid crystal display device in which each entire pixel contributes to displaying. In other words, when performing display under the transmission mode, the region through which light is transmitted is narrow and the aperture ratio is small, so that it is difficult to secure sufficient brightness; on the other hand, when performing display under the reflection mode, the region which reflects light is narrow, so that it is difficult to secure sufficient brightness. Moreover, in the light transmitting region during display under the reflection mode and in the light reflecting region during display under the transmission mode, the retardation of the liquid crystal layer is not optimized, thus allowing light leakage to occur and increasing the luminance in the black displaying state. This leads to a problem of a lowered contrast ratio.

Due to the prevalence of the Internet in the recent years, the contents to be displayed on a display of an electronic device for mobile purposes may be various, i.e., not only simple text information, but also still images such as photographs and pictures, as well as moving pictures. The inventor of the present invention has studied the relationship between the type of displayed content and the display mode. As a result, it was found that, when displaying text information or still images, displaying under the reflection mode is preferable from the standpoint of visual recognition, and when displaying moving pictures, displaying under the transmission mode is preferable from the standpoint of regarding vividness and luminance as important. However, in a conventional dual-use type liquid crystal display device, even if displaying under the reflection mode and displaying under the transmission mode are switched in accordance with the content to be displayed, the display characteristics will not be sufficient, as already described above.

Furthermore, due to diversification of the contents to be displayed, it is expected that different types of information will frequently be displayed simultaneously within a display region of a display device (e.g., moving pictures and text information). However, with a conventional dual-use type liquid crystal display device, it is impossible to perform display under the transmission mode in a partial region within the display region while performing display under the reflection mode in the other region.

Thus, to date, no display device which exhibits sufficient display characteristics in a multitude of scenes, or no display device which is suitable for the displaying of multiple contents, has been developed.

SUMMARY OF THE INVENTION

The present invention has been made in view of the above problems, and a main purpose thereof is to provide a display system which has good display characteristics during both display under the transmission mode and display under the reflection mode, and which is suitable for use in a multitude of scenes and/or displaying of multiple contents.

A display system according to the present invention is a display system comprising: a dimming device capable of switchably presenting a light reflecting state or a light transmitting state; and a display device for displaying information by modulating light transmitted through the dimming device and/or light reflected by the dimming device, wherein the dimming device has a plurality of regions each being independently capable of switchably presenting a light reflecting state or a light transmitting state, and, when a plurality of types of information are being displayed on the display device, the dimming device is capable of selectively switching between the light reflecting state or the light transmitting state of each of the plurality of regions in accordance with the types of information being displayed.

In a preferred embodiment, the display device supplies a display signal to a first display region for performing display by modulating the light transmitted through the dimming device, and supplies a display signal to a second display region for performing display by modulating the light reflected by the dimming device, the display signals being of different types.

In a preferred embodiment, the display device has a plurality of pixels; and each of the plurality of regions of the dimming device corresponds to each of the plurality of pixels in a one-to-one relationship.

In a preferred embodiment, the dimming device is a dimming device having a layered structure including a first layer and a second layer, such that a light reflectance of the first layer changes in response to an external stimulation; the first layer contains a first material whose optical characteristics change in accordance with a concentration of a specific element; and the second layer contains a second material capable of containing the specific element, the second material releasing or absorbing the specific element in accordance with the external stimulation.

In a preferred embodiment, the dimming device is a dimming device comprising a dimming layer whose light reflectance changes in response to an external stimulation; and the dimming layer contains a first material whose optical characteristics change in accordance with a concentration of a specific element, the first material being particles.

Alternatively, a display system according to the present invention is a display system comprising: a dimming device capable of switchably presenting a light reflecting state or a light transmitting state; and a display device for performing display by modulating incident light, wherein, the dimming device is a dimming device having a layered structure including a first layer and a second layer, such that a light reflectance of the first layer changes in response to an external stimulation; the first layer contains a first material whose optical characteristics change in accordance with a concentration of a specific element; and the second layer contains a second material capable of containing the specific element, the second material releasing or absorbing the specific element in accordance with the external stimulation.

Typically, the display device performs display by modulating light transmitted through the dimming device and/or light reflected by the dimming device.

In a preferred embodiment, the element is hydrogen, and the first material is able to transition between a light reflecting state and a light transmitting state in accordance with a hydrogen concentration.

In a preferred embodiment, the second layer contains a hydrogen storage material.

In a preferred embodiment, operation occurs in a region where respective hydrogen equilibrium pressure-composition isotherms (PTC characteristic curves) of the first layer and the second layer are substantially flat.

In a preferred embodiment, in the region where the PTC characteristic curves are substantially flat, hydrogen equilibrium pressures of the first layer and the second layer are about the same.

In a preferred embodiment, a range of hydrogen storage amount of the second layer in the region where the PTC characteristic curve is substantially flat encompasses a range of hydrogen storage amount of the first layer in the region where the PTC characteristic curve is substantially flat.

In a preferred embodiment, the second material releases or absorbs the specific element through exchanges of electrons.

In a preferred embodiment, the second material releases or absorbs the specific element in response to light irradiation.

In a preferred embodiment, the second layer contains a material having a photocatalytic ability.

In a preferred embodiment, a pair of conductive layers for forming an electric field for causing ions of the specific element to move from the second material to the first material, or from the first material to the second material, are comprised.

In a preferred embodiment, the first and second layer are positioned between the pair of conductive layers.

In a preferred embodiment, the first layer has conductivity, and functions as one of the pair of conductive layers.

In a preferred embodiment, the second layer has conductivity, and functions as one of the pair of conductive layers.

In a preferred embodiment, the second layer has a light transmitting ability.

In a preferred embodiment, at least one of the first layer and the second layer has a multi-layer structure.

Alternatively, a display system according to the present invention is a display system comprising: a dimming device capable of switchably presenting a light reflecting state or a light transmitting state; and a display device for performing display by modulating incident light, wherein, the dimming device is a dimming device comprising a dimming layer whose light reflectance changes in response to an external stimulation; and the dimming layer contains a first material whose optical characteristics change in accordance with a concentration of a specific element, the first material being particles.

Typically, the display device performs display by modulating light transmitted through the dimming device and/or light reflected by the dimming device.

In a preferred embodiment, the first material is able to transition between a light reflecting state and a light transmitting state in accordance with the concentration of the specific element.

In a preferred embodiment, the dimming layer diffuse-reflects light when the first material is in the light reflecting state.

In a preferred embodiment, a diameter of the particles is equal to or greater than 350 nm and equal to or less than a thickness of the dimming layer.

In a preferred embodiment, the specific element is hydrogen.

In a preferred embodiment, a conversion layer containing a second material capable of containing the specific element is further comprised, wherein the second material releases or absorbs the specific element in accordance with the external stimulation.

In a preferred embodiment, the specific element is hydrogen, and the conversion layer contains a hydrogen storage material.

In a preferred embodiment, operation occurs in a region where respective hydrogen equilibrium pressure-composition isotherms (PTC characteristic curves) of the dimming layer and the conversion layer are substantially flat.

In a preferred embodiment, in the region where the PTC characteristic curves are substantially flat, hydrogen equilibrium pressures of the dimming layer and the conversion layer are about the same.

In a preferred embodiment, a range of hydrogen storage amount of the conversion layer in the region where the PTC characteristic curve is substantially flat encompasses a range of hydrogen storage amount of the dimming layer in the region where the PTC characteristic curve is substantially flat.

In a preferred embodiment, the second material releases or absorbs the specific element through exchanges of electrons.

In a preferred embodiment, the second material releases or absorbs the specific element through an electrochemical reaction.

In a preferred embodiment, a pair of conductive layers for forming an electric field for causing ions of the specific element to move from the second material to the first material, or from the first material to the second material, are comprised.

In a preferred embodiment, the dimming layer and the conversion layer are positioned between the pair of conductive layers.

In a preferred embodiment, the dimming layer has conductivity, and functions as one of the pair of conductive layers.

In a preferred embodiment, the conversion layer has conductivity, and functions as one of the pair of conductive layers.

In a preferred embodiment, the conversion layer has a light transmitting ability.

In a preferred embodiment, at least one of the dimming layer and the conversion layer has a multi-layer structure.

In a preferred embodiment, the display device is a liquid crystal display device including a pair of substrates and a liquid crystal layer provided between the pair of substrates.

In a preferred embodiment, an illumination device disposed on an opposite side from a viewer with respect to the display device is further comprised.

In a preferred embodiment, the dimming device is disposed between the display device and the illumination device.

In a preferred embodiment, the dimming device is disposed inside the display device.

In a preferred embodiment, the display device includes a first color filter.

In a preferred embodiment, the dimming device includes a second color filter.

In a preferred embodiment, the display device includes a first color filter; the dimming device includes a second color filter; and the second color filter is disposed on an opposite side from a viewer with respect to the first layer.

In a preferred embodiment, the display device includes a first color filter; the dimming device includes a second color filter; and the second color filter is disposed on an opposite side from a viewer with respect to the dimming layer.

DETAILED DESCRIPTION OF PREFERRED EMBODIMENTS

Figure 1:
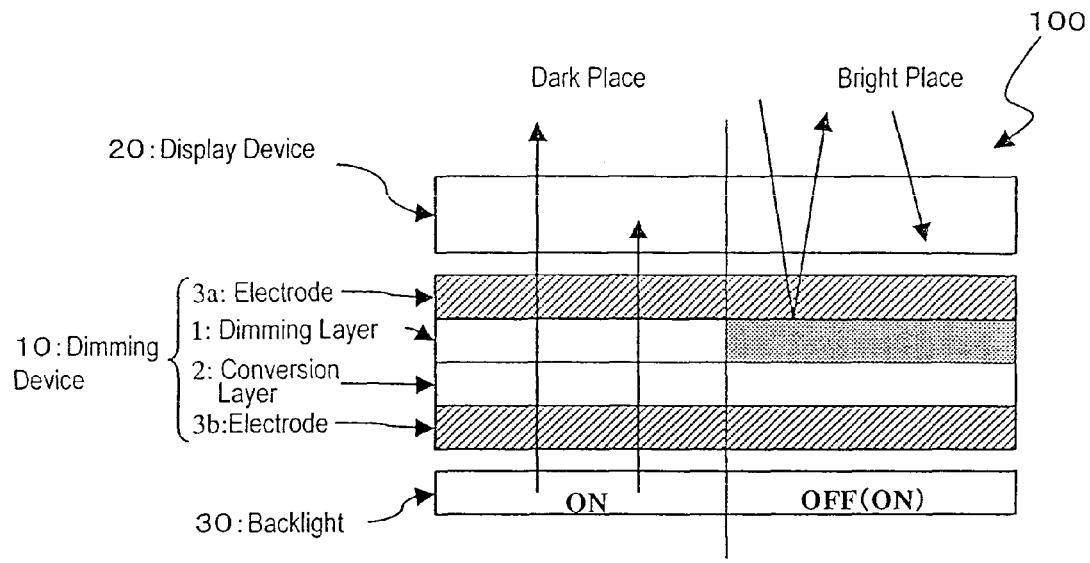
FIG. 1 is a cross-sectional view schematically showing a display system according to the present invention.

Hereinafter, with reference to the figures, embodiments of the present invention will be described. Note that the present invention is not to be limited to the embodiments below.

First, with reference to FIG. 1, the fundamental constitution of a display system 100 according to the present invention will be described.

The display system 100 comprises a dimming device 10 which is capable of switchably presenting a light reflecting state or a light transmitting state, and a display device 20 which performs display by modulating incident light. The display system 100 further comprises a backlight (illumination device) 30 which is disposed at the rear face side (i.e., the opposite side from the viewer) of the display device 20.

The dimming device 10, which is a device capable of switchably presenting a state of reflecting light or a state of transmitting light, is disposed between the display device 20 and the backlight 30. As shown in FIG. 1, the dimming device 10 of the present embodiment has a layered structure including the dimming layer 1 and the conversion layer 2, and the light reflectance of the dimming layer 1 changes responsive to electrical stimulations. The dimming device 10 further comprises a pair of electrodes 3a and 3b, between which the dimming layer 1 and the conversion layer 2 are interposed. The more detailed constitution and operation principles of the dimming device 10 will be described later.

The display device 20 is able to modulate both the light which enters from its front face side and the light which enters from its rear face, and displays information by modulating the light which has been transmitted through the dimming device 10 and/or the light which has been reflected by the dimming device 10. For example, the display device 20 is a liquid crystal display device having a pair of substrates and a liquid crystal layer interposed between these substrates, and controls the orientation state of the liquid crystal layer by applying a voltage to transparent electrodes which are provided on the surfaces of the pair of substrates facing the liquid crystal layer, thus modulating the light traveling through the liquid crystal layer. Note that the display device 20 is not limited to a liquid crystal display device. Any display device may be used that is capable of modulating light which enters from the front face side as well as light which enters from the rear face.

As shown on the left-hand side of FIG. 1, when the dimming device 10 is in a light transmitting state, if the backlight 30 is activated (ON state), light from the illumination device 30 is transmitted through the dimming device 10 and enters the display device 20. Therefore, by modulating this incident light at the display device 20, the display system 100 is able to perform display under the transmission mode.

On the other hand, as shown on the right-hand side of FIG. 1, when the dimming device 10 is in a light reflecting state, light entering the display device 20 from the front face side travels through the display device 20 and thereafter is reflected by the dimming device 10, and again travels through the display device 20. Therefore, by modulating light during this process, the display system 100 is able to perform display under the reflection mode. At this time, the backlight 30 may be deactivated (OFF state) in synchronization with the switching of the dimming device 10 to a light reflecting state, or may be left activated (ON state). If the backlight 30 remains activated, the light from the illumination device 30 is reflected at the dimming device 10, and therefore hardly enters the display device 20.

Thus, the display system 100 is able to switchably perform display under the reflection mode or display under the transmission mode, and the display device 20 can be allowed to function as either a reflection type display device or as a transmission type display device. Since each of the plurality of pixels of the display device 20 does not need to be divided into a region for reflecting light and a region for transmitting light, each entire pixel can contribute to displaying either during display under the reflection mode or during display under the transmission mode in the display system 100. Therefore, as compared to a conventional liquid crystal display apparatus of a transmission/reflection dual-use type such as that disclosed in Patent Document 1, a bright and high-contrast ratio display can be realized in both the reflection mode and the transmission mode. Therefore, the display system 100 of the present invention can be suitably used in various situations, i.e., in a multitude of scenes.

Figure 2:
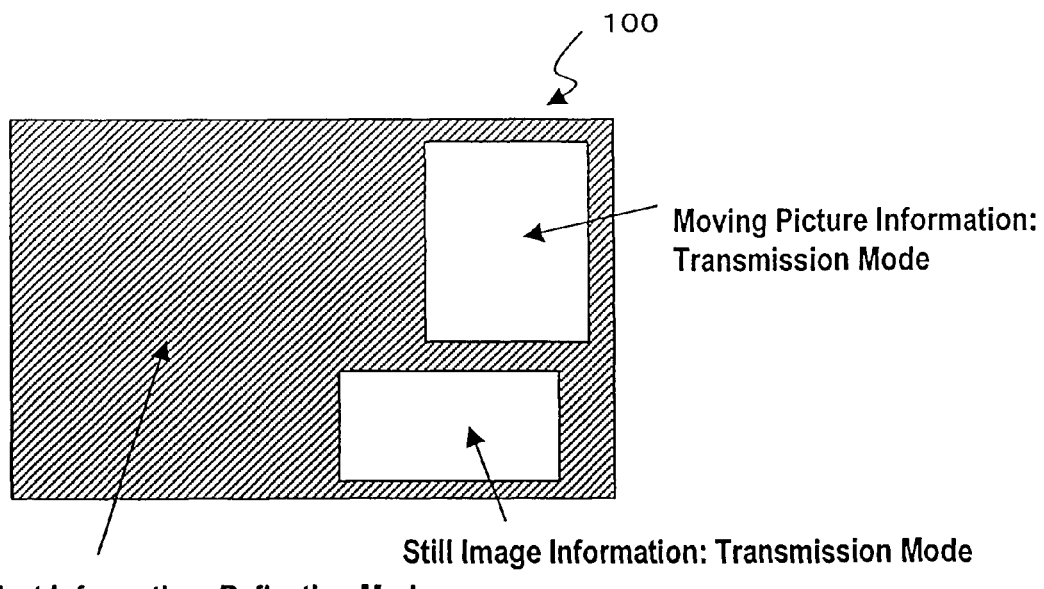
FIG. 2 is a diagram schematically showing how display modes are switched in accordance with content types.

It is preferable that the dimming device 10 has a plurality of regions (referred to as "dimming regions") each of which is independently able to switchably present a light reflecting state or a light transmitting state, and it is preferable that, when a plurality of types of information are displayed on the display device 20, the light reflecting state or light transmitting state of each dimming region is selectively switched in accordance with the type of information. With such a constitution, when different types of contents are displayed on the display device 10, as shown in FIG. 2, display can be performed in a mode which provides optimum visual recognition depending on each content type, so that the display system 100 can be suitably used for displaying multiple contents. Note that, although FIG. 2 illustrates an example where display under the reflection mode is performed in a region where text information is displayed and display under the transmission mode is performed in regions where moving picture information and still image information are displayed, the correspondence between contents and display modes is not limited thereto. For example, from the standpoint of being easy on the eyes, display under the reflection mode may be performed in a region where still image information is displayed.

In the case of the dimming device 10 of the present embodiment, for example, the electrodes 3a and 3b sandwiching the dimming layer 1 and the conversion layer 2 may be patterned into predetermined shapes, whereby it becomes possible to independently apply electrical stimulations to a plurality of sites in the dimming layer 1, thus realizing a plurality of dimming regions.

The number, size, positioning, etc., of the dimming regions may be appropriately determined based on the purpose and the like of the display system 100.

Figure 3:
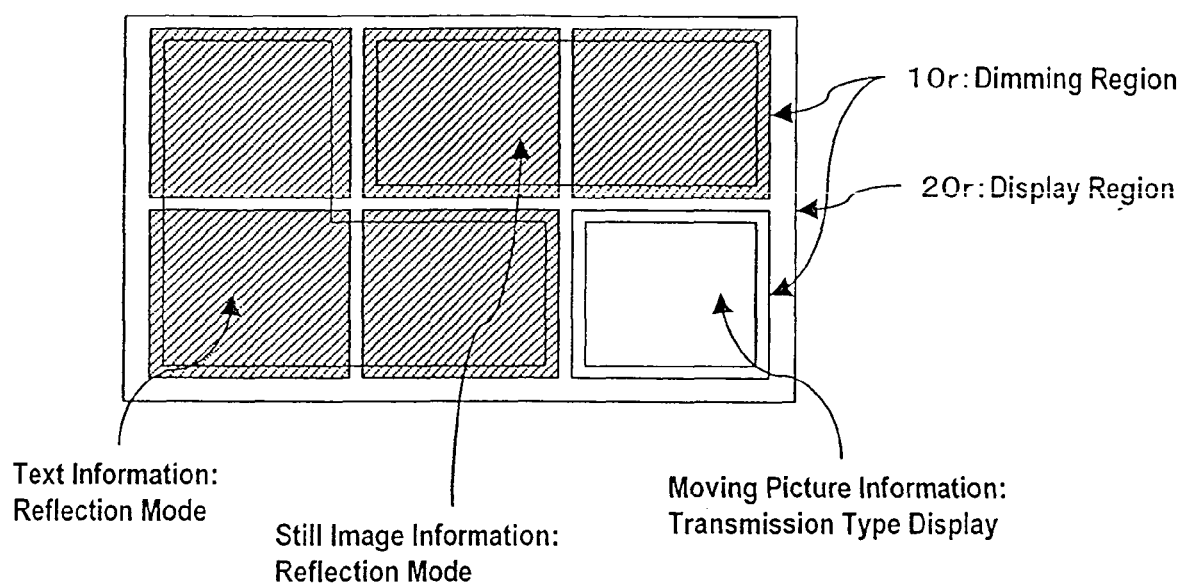
FIG. 3 is a schematic diagram showing a manner in which display modes are switched.

For example, as shown in FIG. 3, the dimming device 10 may be divided relatively roughly, and the size of each content to be displayed in a display region 20r (size of each region to be displayed) may be adapted to the size of a dimming region 10r.

Figure 4:
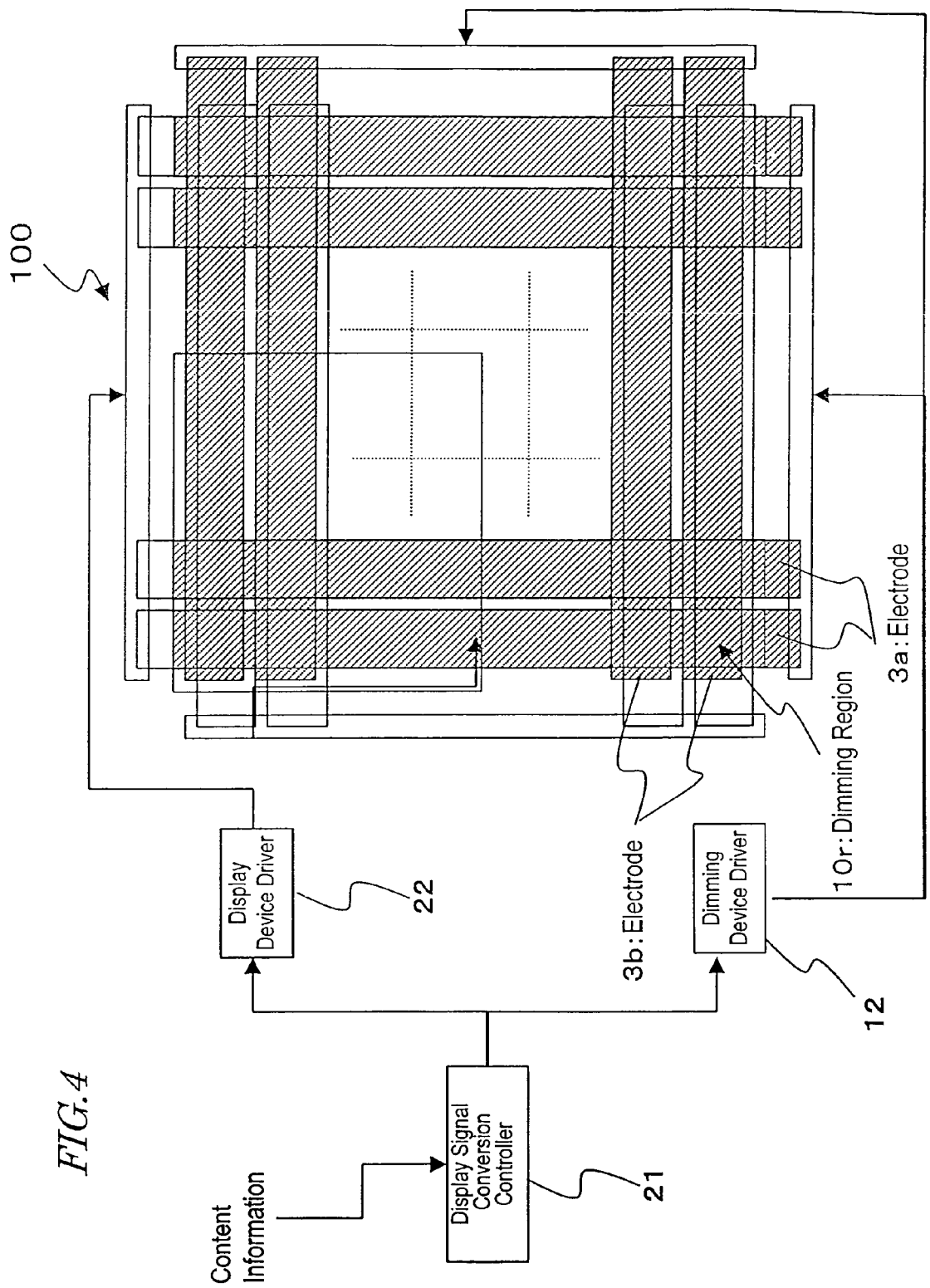
FIG. 4 is a schematic diagram showing a manner in which display modes are switched.

Alternatively, as shown in FIG. 4, the dimming device 10 may be divided into sizes substantially the same as those of the pixels of the display device 20, and each dimming region 10r may be switched between the light transmitting state and the light reflecting state, in accordance with the size of a content to be displayed in the display region 20r.

In FIG. 4, dimming regions 10r are defined at the intersections between electrodes 3a and 3b, which are patterned in stripes having substantially the same pitch as a pixel pitch of the display device 20, each dimming region 10r corresponding to each pixel of the display device 20 in a one-to-one relationship. First, content information to be displayed is converted by a display signal conversion controller 21 into a signal for displaying. Next, when sending a signal to a display device driving circuit (display device driver) 22 for driving the display device 20, a synchronized signal is also sent to a dimming device driving circuit (dimming device driver) 12 for driving the dimming device 10, whereby it becomes possible to selectively switch between the light reflecting state and the light transmitting state of each dimming region of the dimming device 10 in accordance with the type of the content displayed by the display device 20.

Note that, displaying under the reflection mode (which is easy on the eye) is often preferable when displaying text information or still image information, from the standpoint of visual recognition; and displaying under the transmission mode is often preferable when displaying moving picture information, from the standpoint of regarding vividness and luminance as important. However, since differences in visual recognition and differences in preferences concerning images may exist for each viewer, it is more preferable to permit the display mode to be manually switchable.

(Dimming Device)

Hereinafter, the constitution and operation principles of the dimming device 10 according to the present embodiment will be described. Prior to that, a technique which has conventionally been proposed as a dimming mirror will be described.

A phenomenon in which a metal thin film of yttrium (Y), lanthanum (La), or the like binds to hydrogen to change into a hydride which can transmit visible light has been reported in the specification of U.S. Pat. No. 5,635,729, and Huibert et al. (Nature, March 1996, vol. 380, pp. 231-234). Since this phenomenon is reversible, by adjusting the hydrogen pressure in the atmosphere, it becomes possible to cause the thin film to change between a metallic luster state and a transparent state.

By changing the optical characteristics of the above thin film so as to switch between a state exhibiting a metallic luster and a transparent state, it becomes possible to realize a dimming mirror which is capable of freely adjusting the reflectance/transmittance of light. If a dimming mirror is used as a windowpane of a building or an automobile, for example, it becomes possible to shield (reflect) or transmit sunlight as necessary.

Such a dimming mirror has, for example, a structure in which a palladium layer is formed on a yttrium thin film. The palladium has a function of preventing surface oxidation of the yttrium thin film, and a function of causing hydrogen molecules in the atmosphere to be efficiently changed into hydrogen atoms so as to be supplied to yttrium. When yttrium chemically binds to hydrogen atoms, either $YH_2$ or $YH_3$ is formed. While $YH_2$ is a metal, $YH_3$ is a semiconductor and has a forbidden band width which is greater than the energy of visible light, and therefore is transparent.

Moreover, since changes of states between $YH_2 \Leftrightarrow YH_3$ occur rapidly (about several seconds) even at room temperature, it is possible to perform switching between a reflection (metallic luster) state and a transparent state depending on the amount of hydrogen content in the atmosphere.

As another material which is capable of such transitioning between metallic luster ⇔ transparent, a $Mg_2Ni$ thin film is disclosed in Japan Society of Applied Physics, 2001 Spring Meeting, 31-a-ZS-14, for example.

Although the above conventional techniques can cause changes in the optical state of a thin film, it would be difficult to practically realize a dimming device by using the described constitutions. For one, it is necessary to expose the thin film to an hydrogen atmosphere. Specifically, it is necessary to control the amount of hydrogen (hydrogen partial pressure) in an atmosphere gas which is in contact with the thin film. Therefore, it is difficult to realize a practical dimming device by using the aforementioned conventional constitution.

Hereinafter, the dimming device 10 according to the present embodiment will be described.

Figure 5:
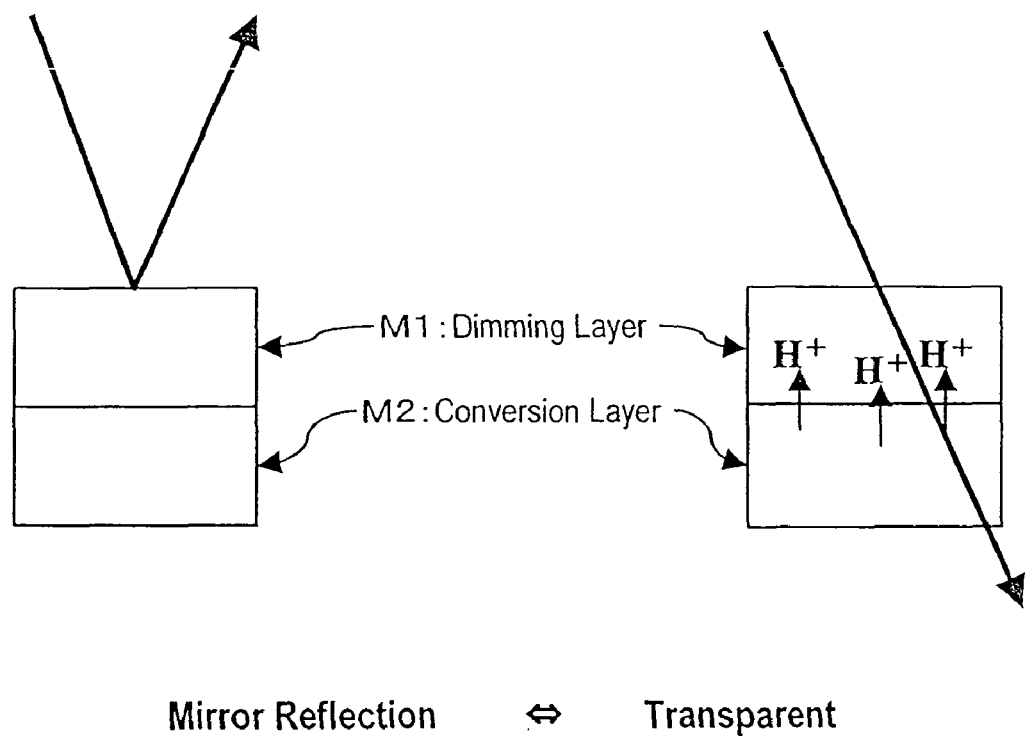
FIG. 5 is a cross-sectional view schematically showing the constitution of a dimming device.

First, the fundamental constitution of the dimming device 10 will be described with reference to FIG. 5. As shown in FIG. 5, the dimming device 10 has a layered structure including a dimming layer M1 and a conversion layer M2, such that the light reflectance of the dimming layer M1 changes in response to external stimulations.

The dimming layer M1 contains a dimming material whose optical characteristics change in accordance with the concentration of a specific element. Preferable examples of the dimming material are Y, La, and $Mg_2Ni$ alloy as described above. Materials such as Y, La, and $Mg_2N$ alloy undergo transitions between metal and semiconductor (or insulator) states in accordance with hydrogen concentration.

The conversion layer M2 contains a material capable of containing a specific element such as hydrogen (which in the present specification is referred to as a "conversion material"). The conversion material releases or absorbs the aforementioned specific element (e.g., hydrogen) in accordance with an external stimulation, such as a charge (electrons or holes) injection/release or light irradiation.

Hereinafter, a mechanism where, responsive to injection/release of a charge, hydrogen ions move from the conversion layer M2 to the dimming layer M1, or from the dimming layer M1 to the conversion layer M2, will be described. A characteristic feature of this mechanism lies in that ions of a specific element (hydrogen) which causes a change in the optical characteristics of the dimming layer M1 are moved, not via an electrochemical reaction, but by way of a charge movement.

First, FIG. 5 is referred to. The dimming layer M1 and the conversion layer M2 shown in FIG. 5 both have the ability to absorb/release hydrogen, and have an electrical conductivity for being able to move charges (electrons or holes) and ions.

Figure 6:
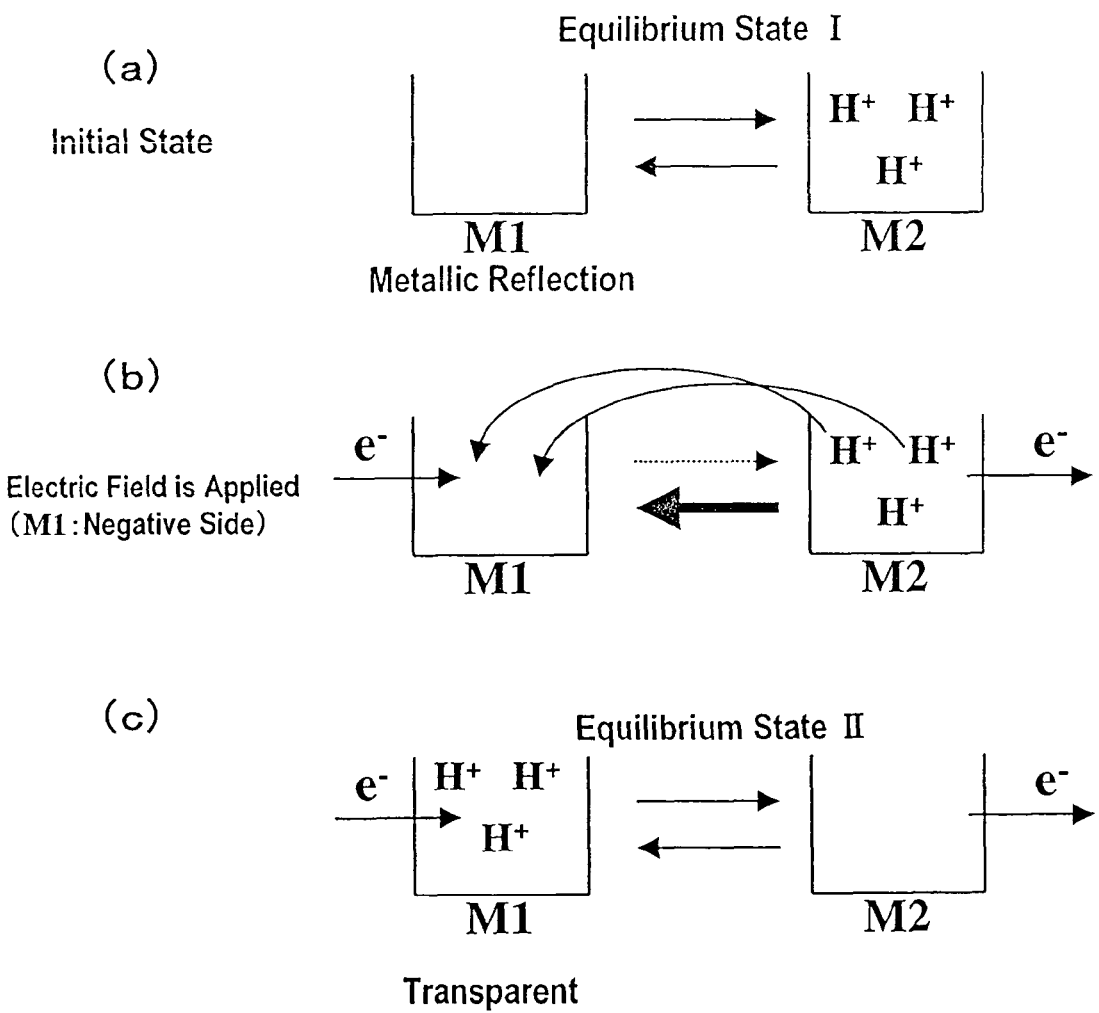
FIGS. 6(a), (b), and (c) are diagrams illustrating operation principles of the dimming device shown in FIG. 5.

Next, FIG. 6(a) is referred to. FIG. 6(a) shows an initial state of the dimming layer M1 and the conversion layer M2 included in the structure of FIG. 5. In this initial state, an equilibrium state is established between the dimming layer M1, which substantially stores no hydrogen, and the conversion layer M2, which has hydrogen stored in advance. Since the dimming layer M1 lacks a sufficient concentration of hydrogen, the dimming layer M1 is in a metallic state, thus exhibiting metallic luster.

Next, as shown in FIG. 6(b), a negative potential is applied to the dimming layer M1 side, while a positive potential is applied to the conversion layer M2 side. At this time, electrons are injected to the dimming layer M1 from a negative electrode (not shown), so that the dimming layer M1 enters an electron-rich state. On the other hand, holes are injected to (i.e., electrons are withdrawn from) the conversion layer M2. The holes which have been injected to the conversion layer M2 move inside the conversion layer M2 toward the dimming layer M1. During such movements of the holes, if further holes continue to be injected to the conversion layer M2, the conversion layer M2 enters a hole-rich state. As a result, the conversion layer M2 enters a state where hydrogen ions are likely to be released, whereas in the dimming layer M1, the amount of hydrogen ions which are received from the conversion layer M2 and retained therein increases.

Therefore, the hydrogen equilibrium state which existed between the dimming layer M1 and the conversion layer M2 is broken, so that the dimming layer M1 takes a state where more hydrogen is likely to be retained, and thus the hydrogen ions released from the conversion layer M2 will move to the dimming layer M1. Thus, as shown in FIG. 6(c), a new equilibrium state is established. In this state, the hydrogen which has moved to the dimming layer M1 binds to the dimming material, whereby the dimming layer M1 becomes transparent.

The above reaction can be described as M1+M2(H)→M1(H)+M2. Herein, M1(H) and M2(H) respectively represent a state where hydrogen is retained in the dimming layer M1 and a state where hydrogen is retained in the conversion layer M2.

As is clear from the above explanation, only hydrogen ion exchanges take place between the dimming layer M1 and the conversion layer M2, and no other reactions involving ions are taking place. Moreover, when the polarities of the applied voltages are inverted from the state of FIG. 6(c), a reaction will progress in the opposite direction, thus returning to the original equilibrium state shown in FIG. 6(a).

Thus, according to the present invention, it is possible to drive hydrogen by causing the hydrogen equilibrium state to be changed based on movements of charges (electrons or holes). Therefore, it is unnecessary to involve any ions other than hydrogen ions in the reaction. As a result, the response speed becomes faster than in any electrochemical reaction that involves a plurality of kinds of ions. Moreover, since no electrochemical reaction occurs, there is little possibility for hydrogen gas to be generated at the positive side, so that a stable operation is enabled as an electronic device.

Hereinafter, the more specific constitution of the dimming device 10 will be described.

Figure 7:
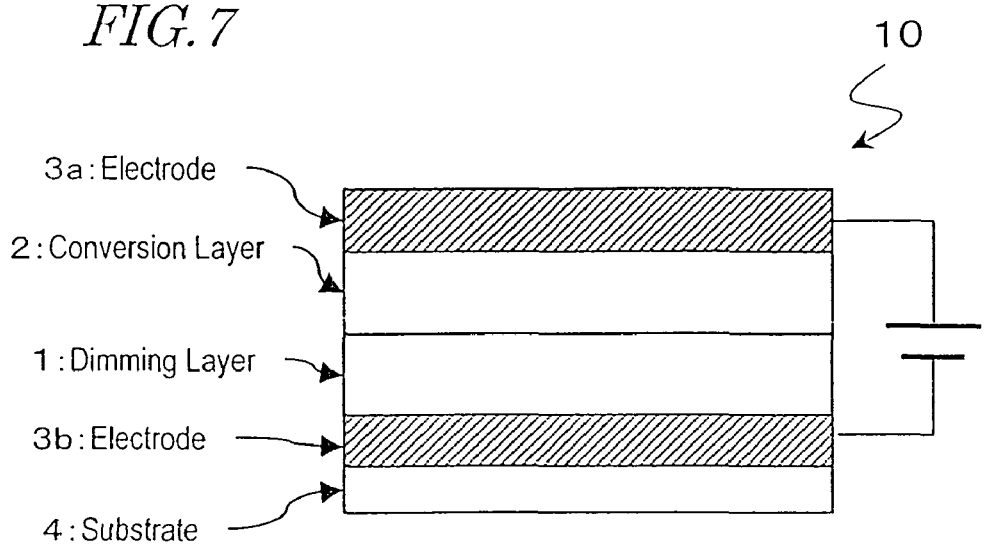
FIG. 7 is a cross-sectional view schematically showing a dimming device.

The dimming device shown in FIG. 7 has a layered structure including a dimming layer 1 and a conversion layer 2, such that the light reflectance (optical characteristics) of the dimming layer 1 changes in response to electrical stimulations. This dimming device comprises a pair of electrodes 3a, 3b sandwiching the dimming layer 1 and the conversion layer 2, and a substrate 4 supporting the layered structure. An appropriate voltage is to be externally applied to the pair of electrodes 3a, 3b. However, the electrode 3a and the electrode 3b may simply be short-circuited as necessary.

Note that the layering order of the conversion layer 2 and the dimming layer 1 with respect to the substrate 4 is not limited to that which is illustrated in the figures, but the conversion layer 2 may be disposed so as to be closer to the substrate 4, with the dimming layer 1 being formed thereupon.

The dimming layer 1 in the present embodiment contains a dimming material (e.g., yttrium) whose optical characteristics change in accordance with the hydrogen concentration. The whole or part of the dimming layer 1 may be composed of a single layer or multiple layers of dimming material. Alternatively, particles of dimming material may be present, in a dispersed or linked state, within a film which is composed of another material.

The conversion layer 2 contains a conversion material which is capable of containing hydrogen. This conversion material performs exchanges of electrons with the electrode 3a, thus effecting release/absorption of hydrogen ions ($H^+$).

In the illustrated example, a positive potential is applied to the electrode 3a and a negative potential is applied to the electrode 3b, whereby hydrogen ions are released from the dimming material in the conversion layer 2 containing a sufficient amount of hydrogen in advance. The released hydrogen ions move within an electric field which is generated in the layered structure, and reach the dimming layer 1, thus leaving the dimming material doped therewith. Such a mechanism of hydrogen release and movement is as described above. The dimming material in the dimming layer 1 binds to hydrogen, thus forming a hydrogen metal compound. As a result, the dimming material, which was initially in a metallic state, changes to a semiconductor or insulator that transmits visible light.

The dimming layer 1 may be produced by a vapor deposition technique, a sputtering technique, or the like. In the case where the dimming layer 1 is to function as a mirror exhibiting a metallic luster, the dimming layer 1 is preferably formed from a film which has as good a planarity as possible.

The conversion material contained in the conversion layer 2 is able to store and retain atoms or ions of hydrogen in its stationary state, and changes its hydrogen storage amount (retained amount) in accordance with external stimulations. As this material capable of storing hydrogen, alloys such as $LaNi_5$, $MnNi_5$, $CaNi_5$, $TiMn_{1.5}$, $ZrMn_{1.5}$, $ZrMn_2$, TiNi, TiFe, and $Mg_2Ni$ can be used. Moreover, carbon nanotubes (CNT) may also be used.

The conversion layer 2 may contain an electrically conductive material in addition to the hydrogen storage material. If an electrically conductive material is contained in the conversion layer 2, it is possible to rapidly perform exchanges of hydrogen ions with the dimming layer 1. As an electrically conductive material, a material capable of ion transmission, such as a liquid or solid electrolyte, or a conductive polymer or a charge transfer complex which transmits charge (electrons or holes) can be used. Moreover, in addition to the aforementioned hydrogen storage material or electrically conductive material, a binding material such as a binder resin may be added to the conversion layer 2 as necessary. Note that, in order to surely restrain the charge which has been injected from one electrode from immediately moving to the other electrode, a separator layer may be inserted between the dimming layer and the conversion layer. As the material of the separator layer, it is desirable to choose a material which permits ion movement but is unlikely to permit charge movement. For example, an ion exchanger, a porous insulator, an ion conductive polymer material or the like can be used. By disposing a separate layer composed of such a material, the charge which has been injected from an electrode is surely prevented from penetrating to the other electrode, whereby the charge movement efficiency between the dimming layer and the conversion layer can be enhanced.

In the case where the conversion layer 2 is composed of a mixture of a plurality of materials, a solution obtained by dissolving such materials in a solvent may be prepared and applied by a spin coating technique or a printing technique, whereby the conversion layer 2 can be easily formed. Such formation of the conversion layer 2 may be performed by an ink jet technique or any other thin film deposition technique.

As described above, according to the present embodiment, exchanges of charges and ions occur inside the conversion layer 2 responsive to application of a voltage to the electrodes 3a, 3b. As a result, owing to the aforementioned mechanism, hydrogen movement can be induced between the conversion layer 2 and the dimming layer 1. Therefore, for example, by using a dimming layer 1 which is undoped with hydrogen in an initial state and a conversion layer 2 having hydrogen stored in advance, if a voltage as shown in FIG. 5 is applied, hydrogen ions move from the positive side to the negative side, thus making the dimming layer 1 doped therewith. In other words, a hydrogen release reaction progresses at the positive side, whereas a combination reaction between hydrogen and a metal progresses at the negative side, whereby a hydrogen metal compound is formed. On the other hand, if a voltage in the opposite direction is applied, a hydrogen movement in the opposite direction occurs. Therefore, by reversing the polarity of the applied voltage, the optical state of the dimming layer 1 can be reversibly switched between metallic luster and transparent.

When only contemplating a movement of the hydrogen stored in the conversion layer 2, the electrodes 3a and the electrodes 3b might be short-circuited outside of the layered structure. Such short-circuiting would be a similar phenomenon to a discharging of a secondary battery, and enable restoration of the internal state of the layered structure to the initial state.

Since the conversion layer 2 and the dimming layer 1 have the ability to retain hydrogen, when voltage application is not performed (when the external circuit is open), no hydrogen movement occurs, so that the optical state of the dimming layer 1 is retained (memory function of the dimming layer). Therefore, by choosing a material having a good hydrogen retaining ability, it becomes possible to retain a dimmed state for a long period of time without consuming power.

Contrary to the above example, a dimming layer 1 doped with hydrogen in advance, and a conversion layer 2 in a state not storing hydrogen may be used. In that case, hydrogen may be moved from the dimming layer 1 to the conversion layer 2 by applying a positive potential to the dimming layer 1 and a negative potential to the conversion layer 2, thus causing a change in the optical state of the dimming material in the dimming layer 1.

In the present embodiment, the light reflectance/light transmittance of a dimming material can be controlled based on a doping amount of hydrogen. Therefore, by controlling the voltage to be applied to the electrode and application time (e.g., a duty ratio), the light reflectance/light transmittance of the dimming layer 1 can be controlled. By utilizing the memory ability based on hydrogen retaining ability, an appropriate light reflectance/light transmittance can be easily retained.

Figure 8:
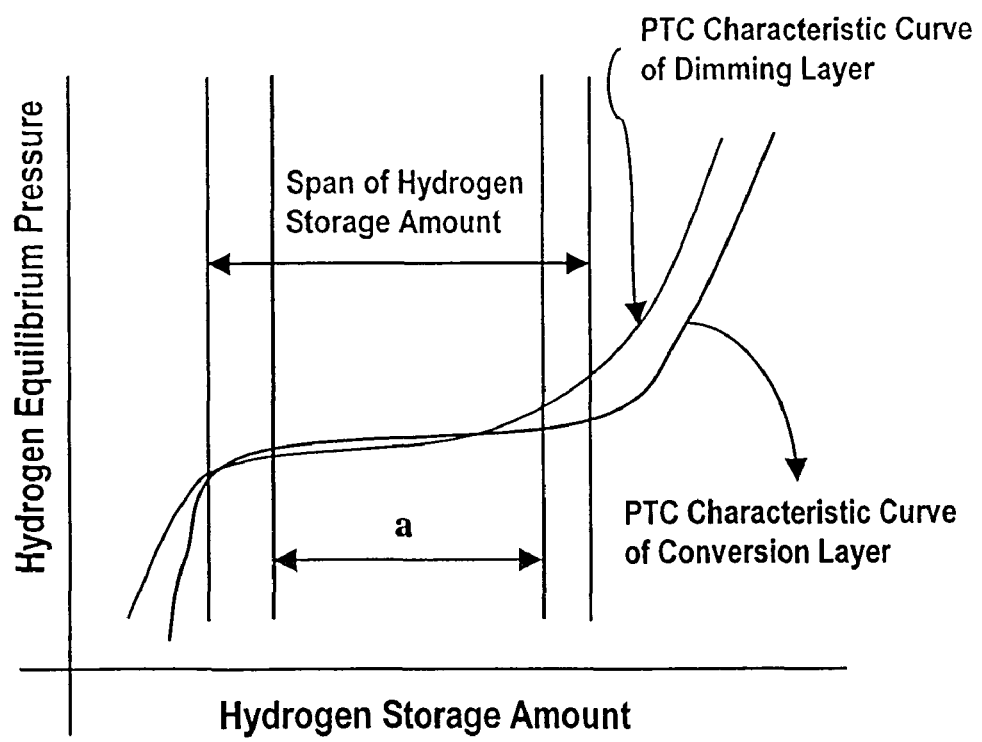
FIG. 8 is a graph showing a hydrogen equilibrium pressure-composition isotherm (PTC characteristic curve) of a dimming layer and a conversion layer.

In appropriately controlling such hydrogen storage/release, it is necessary to pay attention to the hydrogen equilibrium pressure-composition isotherm (hereinafter referred to as a "PTC characteristic curve") As shown in FIG. 8, the PTC characteristic curve represents a relationship between the stored hydrogen amount and the hydrogen equilibrium pressure. In the graph of FIG. 8, the horizontal axis represents the hydrogen storage amount, whereas the vertical axis represents the hydrogen equilibrium pressure.

In a portion of the PTC characteristic curve that is generally parallel to the horizontal axis (hereinafter referred to as the "plateau region"), the stored hydrogen amount is capable of changing under a constant equilibrium pressure, and therefore hydrogen absorption/release can be reversibly carried out in a state under a constant hydrogen equilibrium pressure. For this reason, the dimming device of the present embodiment performs switching operations in the plateau region of the PTC characteristic curve.

It is desirable that the conversion layer 2 and the dimming layer 1 exhibit substantially similar PTC characteristics. More specifically, as shown in FIG. 8, it is desirable that the ranges of "hydrogen storage amount" of the plateau regions of the PTC characteristic curves of the conversion layer 2 and the dimming layer 1 overlap each other, and that the "hydrogen equilibrium pressure" levels are substantially equal. By exhibiting similar hydrogen equilibrium pressures, it becomes possible to smoothly perform hydrogen exchanges between the dimming layer 1 and the conversion layer 2. The reason is that, if the hydrogen equilibrium pressure difference between the dimming layer 1 and the conversion layer 2 becomes large, it will be impossible to perform hydrogen exchanges between the two layers even if hydrogen absorption/release occurs in each layer.

Moreover, it is more preferable that the hydrogen storage amount range (span) of the plateau region of the PTC characteristic curve of the conversion layer 2 is of a size encompassing the hydrogen storage amount range (span) of the plateau region of the PTC characteristic curve of the dimming layer 1. The reason is that, in the dimming device of the present embodiment, the light transmittance of the dimming layer 1 is controlled by the hydrogen doping amount of the dimming layer 1; therefore, if the extent of change in the hydrogen storage amount of the conversion layer 2 were smaller than the extent of change in the hydrogen doping amount that is necessary for causing a state change of the dimming layer 1, the optical state of the dimming layer 1 would not be sufficiently changed.

FIG. 7 is referred to again. Since the dimming device 10 shown in FIG. 7 performs switching between a metallic reflection state and a transparent state, it is preferable that the entire device has a high transparency. In order to establish a high transparency state, not only the substrate 4 and the electrodes 3a, 3b but also the conversion layer 2 must be formed from a material which has a high transmittance (no absorption) in the entire visible light region. However, a conversion material such as a hydrogen storage material is often a metal or a colored material, and it may be difficult to form a conversion layer 2 having a high transparence from a layer of such a conversion material. Therefore, it is preferable to form the conversion layer 2 by mixing microparticles of a conversion material with a transparent material. Specifically, nanoparticles having a grain size equal to or less than the light wavelength are formed from a conversion material, and these nanoparticles may be bound with a binder resin which has a good transparence. A conversion layer 2 thus produced is not only able to exhibit both transparence and hydrogen storing ability, but an increase in the hydrogen absorption/release efficiency can also be expected since the conversion material has an increased surface area because of being made into nanoparticles. An increase in the hydrogen absorption/release efficiency of the conversion material is preferable because the response speed of the dimming operation would be improved. As a conversion material in an ultrafine particle state, a carbon type material (e.g., CNT and fullerene), a potassium-graphite interlayer compound or the like can also be used.

In order to realize exchanges of charges and ions between the dimming layer 1 and the conversion layer 2, it is preferable to dispose a film of conductive polymer material P1 (a material capable of transporting both charges, i.e., electrons and holes) between the dimming layer 1 and the conversion layer 2. Instead of disposing a polymer film having a charge moving ability, an electrolyte film may be disposed. By disposing an electrolyte film, movement of hydrogen ions becomes likely to occur via the electrolyte, and therefore it is possible to improve the characteristics. The conductive polymer material P1 is doped with ions for conferring conductivity, and therefore also functions as an electrolyte film. A blend of a conductive polymer material P1 and, as a binder resin, an acrylic resin having about the same refractive index as that of glass can be used.

The dimming device is not limited to those described above, but permits various modifications. Hereinafter, with reference to FIGS. 9 to 13, other dimming devices 10A to 10D will be described.

Figure 9:
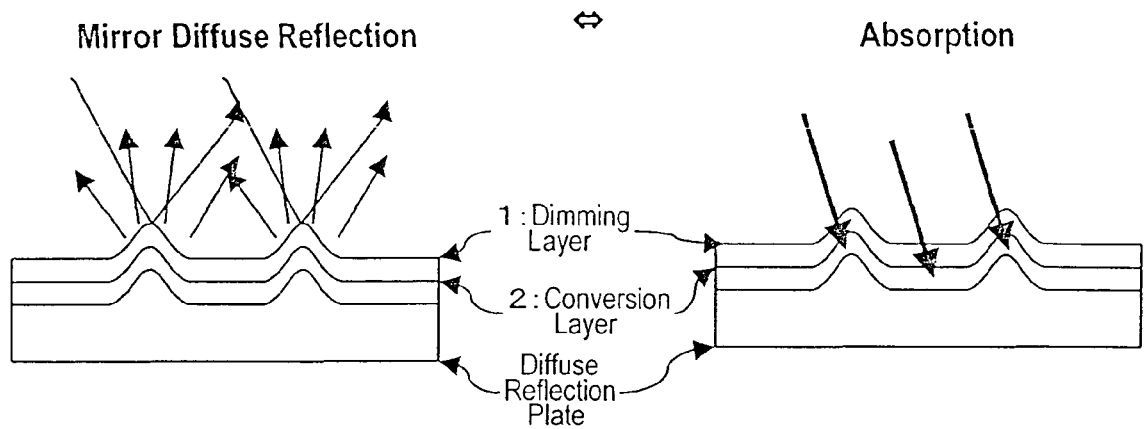
FIG. 9 is a diagram showing the operation of another dimming device.
Figure 10:
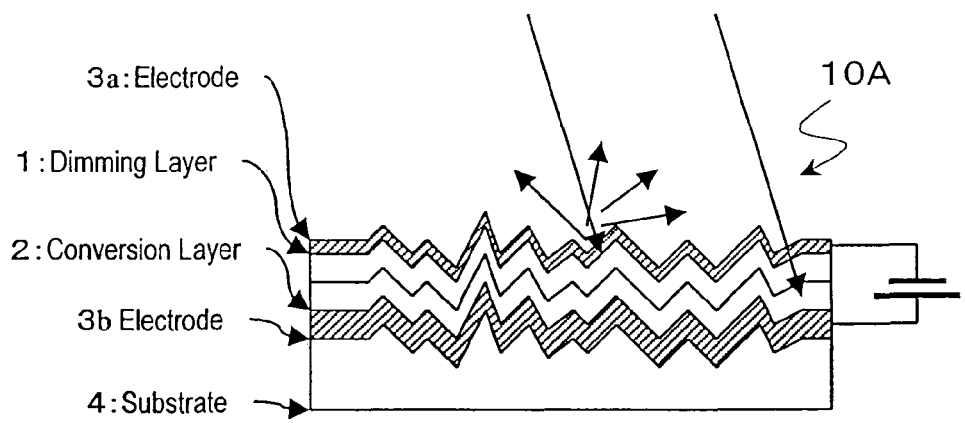
FIG. 10 is a cross-sectional view schematically showing another dimming device.

The dimming device 10A shown in FIG. 9 and FIG. 10 is capable of switching between a metal diffuse reflection (white) state and a light transmitting state.

As shown in FIG. 10, the dimming device 10A has a structure in which an electrode 3b, a conversion layer 2, a dimming layer 1, and an electrode 3a are layered in this order on a substrate 4 having bumps and dents. In order to effect diffuse-reflection, minute bumps and/or dents are present on the surface of the dimming layer 1.

With reference to FIG. 9, the operation of the dimming device 10A of FIG. 10 will be described.

In FIG. 9, the electrodes 3a, 3b are omitted from illustration for simplicity. Since minute bumps are present on the surface of the dimming layer 1, light can be diffuse-reflected when the dimming layer 1 is in a metallic reflection state as shown on the left-hand side of FIG. 9. On the other hand, when the dimming layer 1 is in a transparent state as shown on the right-hand side of FIG. 9, the conversion layer 2 in the underlying layer absorbs light.

In the example shown in FIG. 9, the surface of the substrate has minute bumps, and therefore the conversion layer 2 and the dimming layer 1 are of such an overall planarity that the bumps and dents of the substrate are reflected in their shapes. In other words, not only the upper face (the face on the light reflecting side) of the dimming layer 1, but also the bottom face has a shape reflecting the underlying bumps and dents. However, it is not necessary for the underlying conversion layer 2 to have a bump/dent structure. Therefore, minute dents and/or bumps may be formed only on the upper face of the dimming layer 1, while the substrate surface and the conversion layer 2 may be formed flat.

Thus, in accordance with the dimming device 10A, while the dimming layer 1 is in a metallic reflection state, the reflected light is scattered and perceived as white, so that the surface of the dimming layer 1 appears white.

The dimming device 10A may have a similar constitution to that of the dimming device 10, except that the substrate 4 having bumps and dents formed on its surface is used. For example, as the conversion layer 2, what is obtained by blending a potassium-graphite interlayer compound which is a hydrogen storage material, a conductive polymer material P1 (a material capable of transporting both charges, i.e., electrons and holes), and an acrylic resin serving as a binder resin can be suitably used.

Next, with reference to FIG. 11, another dimming device 10B will be described.

Figure 11:
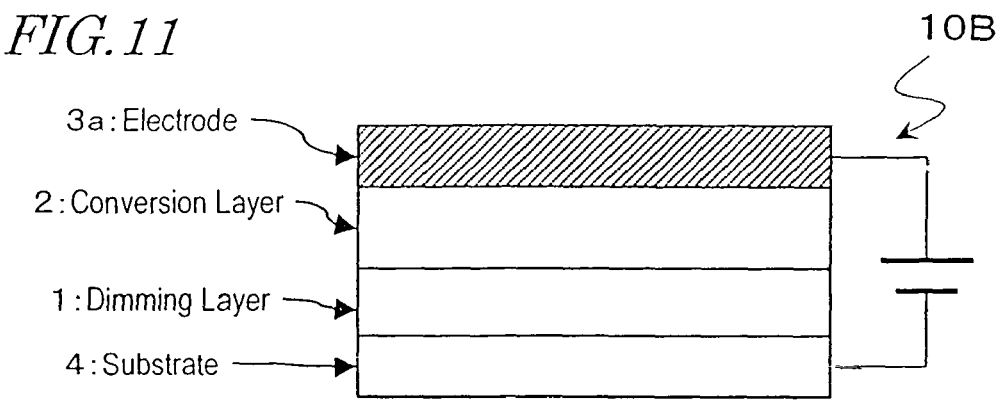
FIG. 11 is a cross-sectional view schematically showing another dimming device.

In dimming device 10B, as shown in FIG. 11, the dimming layer 1 itself doubles as one of the electrodes. Since the dimming layer 1 is fundamentally a metal thin film, the dimming layer 1 can function as an electrode. Since the dimming layer 1 doubles as an electrode, a step of forming an electrode is omitted, whereby the number of production steps for the dimming device can be reduced.

Note that, although the dimming device 10B in FIG. 11 is a transparent-metal reflection type dimming device, the dimming layer 1 can double as an electrode in a dimming device of any other type described above.

Next, with reference to FIG. 12, another dimming device 10C will be described.

The dimming device 10C has a constitution in which a conversion layer is separated into a plurality of layers, i.e., a first conversion layer 2a, and a second conversion layer 2b. In the dimming device of the present embodiment, the dimming layer 1 is doped with a specific element such as hydrogen, whereby the state of the dimming layer 1 is changed. Therefore, by adopting the constitution in which two conversion layers 2a, 2b sandwich the dimming layer 1, efficient doping becomes possible, whereby the speed of the state change necessary for dimming is improved. Since the dimming layer 1 can function as an electrode, the dimming layer 1 is used as an electrode in the example of FIG. 12.

Figure 12:
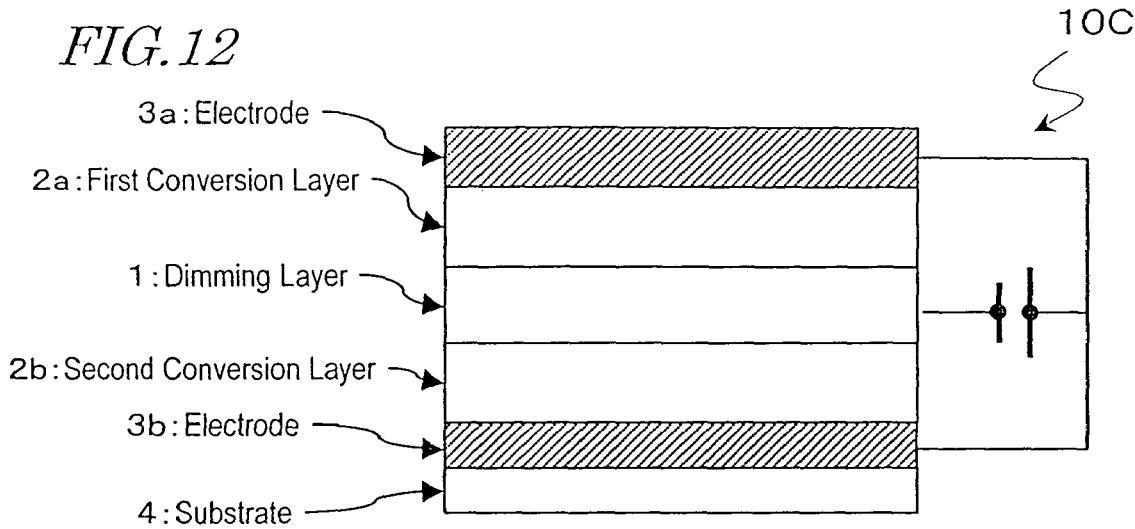
FIG. 12 is a cross-sectional view schematically showing another dimming device.

In the example of FIG. 12, the portion which performs hydrogen absorption/release has a three-layer structure including the first conversion layer 2a, the dimming layer 1, and the second conversion layer 2b, but may have even more layers. Even if sufficient dimming cannot be attained in the case where the dimming layer 1 is of a single layer, it would become possible to attain a sufficient dimming by increasing the number of layers in the dimming layer 1.

Figure 13:
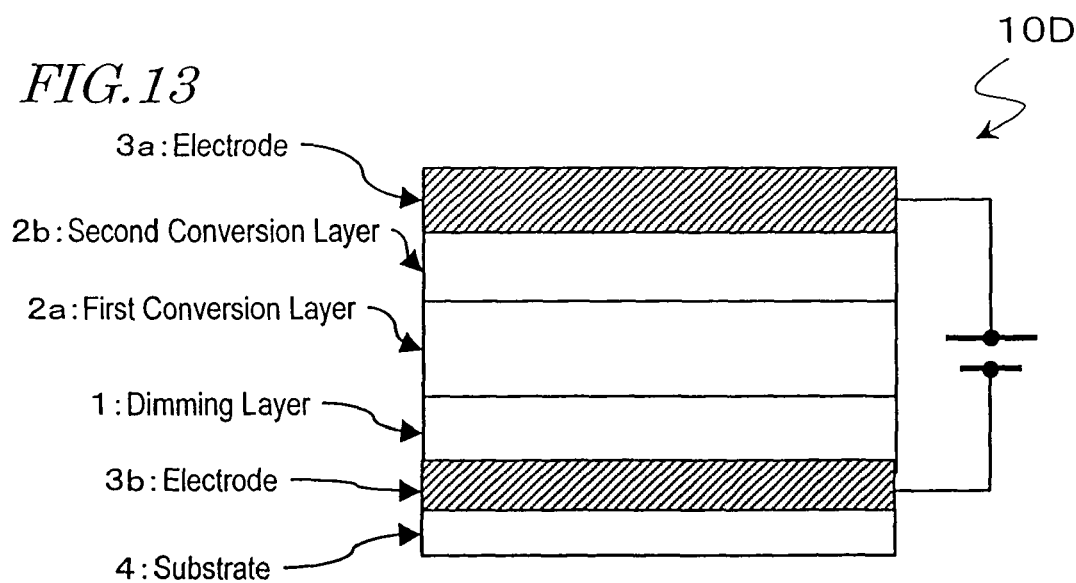
FIG. 13 is a cross-sectional view schematically showing another dimming device.

Next, with reference to FIG. 13, another dimming device 10D will be described.

In the dimming device 10D, the conversion layer 2 has a multi-layer structure in order to separate the functions of the conversion layer 2. As described above, the functions of the conversion layer 2 are to store hydrogen, and to release/restore hydrogen in accordance with charge injection/release. Rather than realizing these functions with a single material, it would be easier to select a different material for each function, and stack layers that are composed of the respective materials. In other words, by separating the conversion layer into a first conversion layer 2a composed of a charge transport material or an electrolyte material for performing exchanges of charges or ions and a second conversion layer 2b formed from a material having a hydrogen storing function, efficient hydrogen movement can be realized.

Herein, a charge ion exchange layer formed by mixing a conductive polymer material P1 (a material capable of transporting both charges, i.e., electrons and holes) and an acrylic resin having about the same refractive index as that of glass is used as the first conversion layer 2a. Moreover, a blended resin obtained by mixing ultrafine particles (dispersion center radius: 10 nm) of an Ni alloy, which is an AB5 type Mm hydrogen storage alloy, and an acrylic resin having about the same refractive index as that of glass is used so as to function as the second conversion layer 2b.

Hereinafter, specific embodiments of the display system according to the present invention will be described.

Embodiment 1

Figure 14:
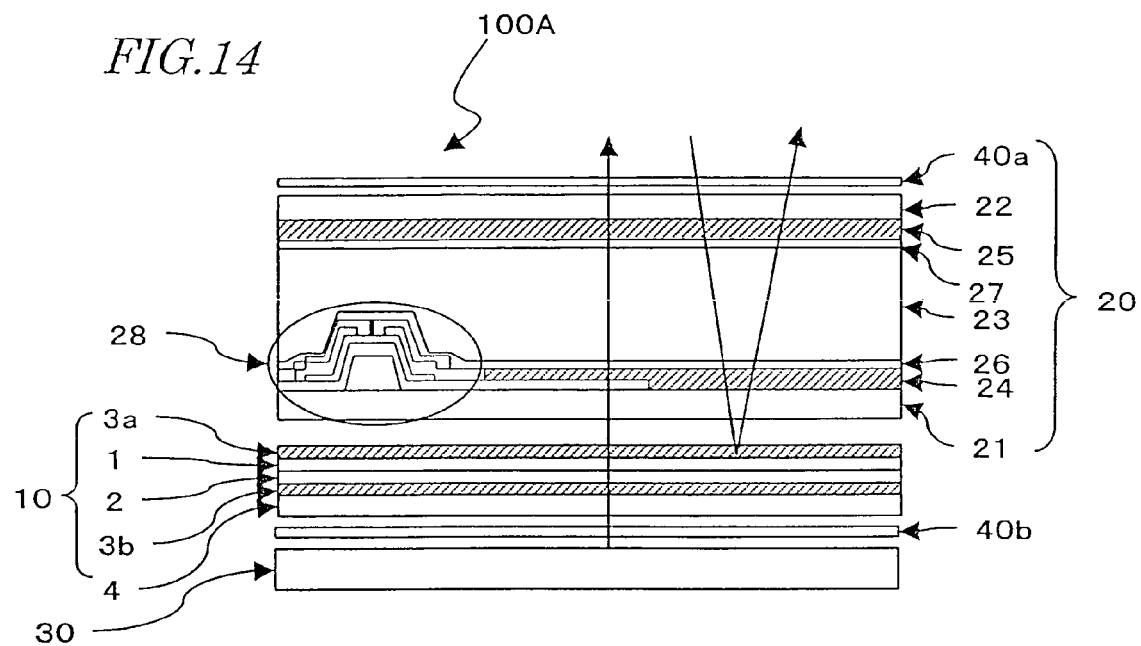
FIG. 14 is a cross-sectional view showing a first embodiment of the display system according to the present invention.

With reference to FIG. 14, a first embodiment of the display system according to the present invention will be described.

As shown in FIG. 14, the display system 100A of the present embodiment comprises: a liquid crystal display device 20; a backlight (illumination device) 30 disposed on the rear face side (i.e., the opposite side from the viewer) of the liquid crystal display device 20; and a dimming device 10 disposed between the liquid crystal display device 20 and the backlight 30. Typically, a pair of polarizer plates 40a and 40b are provided so as to sandwich the liquid crystal display device 20 and the dimming device 10.

The liquid crystal display device 20 comprises a pair of substrates 21 and 22 and a liquid crystal layer 23 interposed therebetween. On the surfaces of the pair of substrates 21 and 22 facing the liquid crystal layer 23, electrodes 24 and 25 for applying a voltage across the liquid crystal layer 23 and alignment films 26 and 27 for aligning the liquid crystal molecules in the liquid crystal layer 23 are provided. The rear-face-side substrate 21 is an active matrix substrate having a thin film transistor 28 (as a switching device) for each pixel.

The liquid crystal display device 20 has a substantially similar constitution to that of a commonly-used transmission type liquid crystal display device, and can be produced in a substantially similar manner. However, since the dimming device 10 is disposed at the rear face side, it is preferable that the rear-face-side substrate 21 is as thin as possible, from the standpoints of securing light transmittance and reducing parallax. In the present embodiment, a glass substrate is used as the rear-face-side substrate 21. By placing the liquid crystal display device 20 into a glass etchant after the outer periphery thereof is firmly sealed, the thickness of the substrate 21 is set to 0.2 mm.

The dimming device 10 of the present embodiment has a layered structure including a dimming layer 1 and a conversion layer 2, such that the light reflectance (optical characteristics) of the dimming layer 1 changes in response to electrical stimulations. This dimming device 10 comprises a pair of electrodes 3a, 3b sandwiching the dimming layer 1 and the conversion layer 2, and further a substrate 4 supporting the layered structure. Herein, the dimming device 10 is produced as follows.

First, a glass substrate is prepared as the substrate 4, and on its surface, a transparent conductive film of ITO, having a thickness of 150 nm, is formed by a sputter technique. Note that a plastic substrate may be used as the substrate 4. Next, this transparent conductive film is patterned into stripes with substantially the same pitch as a pixel pitch of the liquid crystal display device 20, thus forming the electrodes 3b.

Next, the conversion layer 2 is formed on the electrodes 3b by using a blend of: ultrafine particles (dispersion center radius: 10 nm) of an Ni alloy, which is an AB5 type Mm hydrogen storage alloy; a conductive polymer material P1 (a material capable of transporting both charges, i.e., electrons and holes); and, as a binder resin, an acrylic resin having about the same refractive index as that of glass. Since this blended resin can be made into a solution, a spin coating technique is used to form the conversion layer 2 so as to have a thickness of about 500 nm. As for the hydrogen storage alloy, that which has hydrogen stored in advance is used.

Next, by vapor-depositing yttrium (Y) on the conversion layer 2, the dimming layer 1 having a thickness of 50 nm is formed. Thereafter, a transparent conductive film of ITO is formed on the dimming layer 1 by a sputter technique. This transparent conductive film is patterned into stripes perpendicular to the electrodes 3b, with substantially the same pitch as the pixel pitch of the liquid crystal display device 20, thus forming the electrodes 3a. At each intersection between the stripe-like electrodes 3a and electrodes 3b, a dimming region is defined, each dimming region corresponding to each pixel of the liquid crystal display device 20.

The dimming device 10 and the liquid crystal display device 20 thus produced are placed one on top of the other, in such a manner that the dimming regions overlap the pixels. These are sandwiched by the polarizer plates 40a, 40b, and furthermore, the backlight 30 is placed at the rear face side of the dimming device 10, whereby the display system 100A is obtained. As the backlight 30, an illumination device used for a commonly-used transmission type liquid crystal display apparatus can be used.

The display system 100A is able to switch between the light transmitting state and the light reflecting state of the dimming device 10 based on voltage application, and allows the liquid crystal display device 20 to function as either a reflection type liquid crystal display device or a transmission type liquid crystal display device. As a result, an optimum display mode can be selected in accordance with the intensity of ambient light. Furthermore, in the display system 100A, switching of display modes is realized through switching of the dimming device 10. Thus, since each of the plurality of pixels of the liquid crystal display device 20 does not need to be divided into a region for reflecting light and a region for transmitting light, each entire pixel can contribute to displaying either during display under the reflection mode or during display under the transmission mode. Therefore, as compared to a conventional liquid crystal display apparatus of a transmission/reflection dual-use type, a bright and high-contrast ratio display can be realized in both the reflection mode and the transmission mode. Therefore, the display system 100A can be suitably used in various situations, i.e., in a multitude of scenes.

Moreover, in the present embodiment, the electrodes 3a, 3b are patterned into predetermined shapes, and the dimming device 10 includes a plurality of dimming regions each of which is independently able to switchably present a light reflecting state or a light transmitting state. Thus, when a plurality of types of information are displayed on the liquid crystal display device 20, the light reflecting state or light transmitting state of each dimming region can be selectively switched in accordance with the type of information. Therefore, the display system 100A is suitable for the displaying of multiple contents.

Note that, depending on the display device used, different controls may be required for displaying under the reflection mode and displaying under the transmission mode. Therefore, preferably, the display device is able to supply display signals of different types to a display region in which display is performed by modulating light which has been transmitted through the dimming device 10 and to a display region in which display is performed by modulating light which has been reflected by the dimming device 10.

For example, in the case of the liquid crystal display device 20, light travels through the liquid crystal layer 23 twice under the reflection mode, whereas light travels through the liquid crystal layer 23 only once under the transmission mode. Therefore, between a pixel which performs display under the reflection mode and a pixel which performs display under the transmission mode, the dynamic range is different even when producing the same gray scale level, and the amplitude of an electric signal to be supplied to the pixel is also different. Generally speaking, it is considered that the reflection mode is able to provide a large change in light characteristics with a smaller range of control.

Therefore, two types of signals, i.e., one for the reflection mode and one for the transmission mode, may be provided for input to a driver for controlling the liquid crystal display device 20, and in accordance with the switching of each dimming region of the dimming device 10, a display signal for the reflection mode or a display signal for the transmission mode may be selectively supplied to each pixel of the liquid crystal display device 20. As a result, displaying which is optimum with respect to the display mode can be performed in each pixel of the liquid crystal display device 20, and displaying which provides a higher visual recognition can be performed.

Embodiment 2

Figure 15:
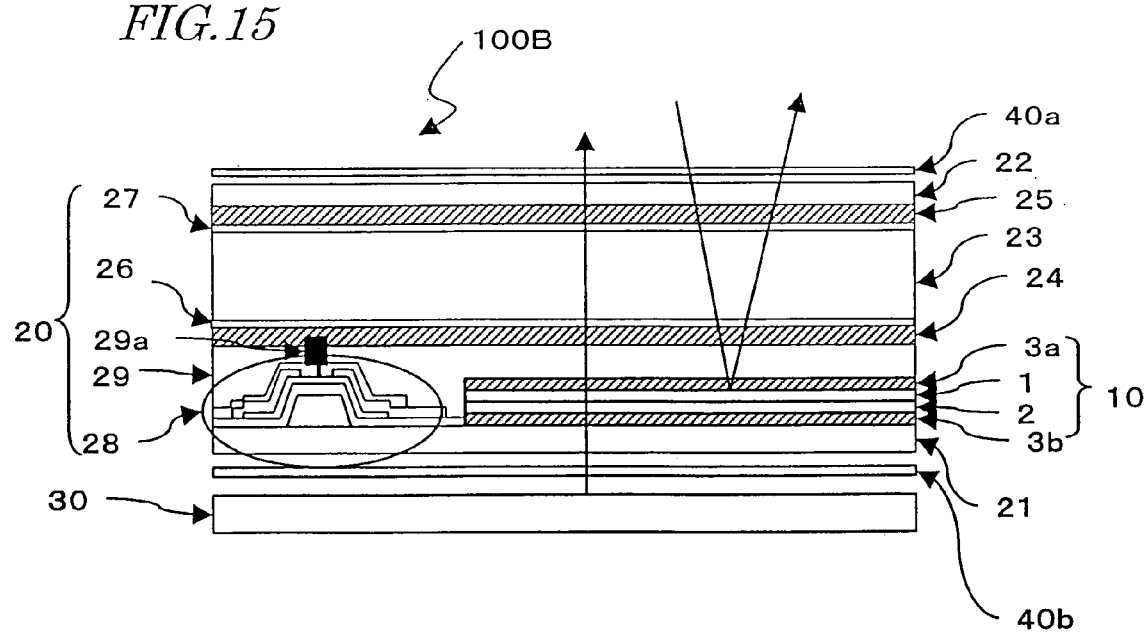
FIG. 15 is a cross-sectional view showing a second embodiment of the display system according to the present invention.

With reference to FIG. 15, a second embodiment of the display system according to the present invention will be described.

A display system 100B of the present embodiment differs from the display system 100A shown in FIG. 14 in that a dimming device 10 is placed inside a liquid crystal display device 20.

As shown in FIG. 15, in the display system 100B, the dimming device 10 is built inside the liquid crystal display device 20. More specifically, when fabricating the rear-face-side active matrix substrate, a step of producing the dimming device 10 is introduced so as to provide the dimming device 10 upon a substrate 21.

For example, after forming TFTs 28 on the substrate 21, the dimming device 10 is built in each pixel. The dimming device 10 can be produced in a similar manner to Embodiment 1. After producing the dimming device 10, a planarization film (overcoat layer) 29 is formed so as to cover the TFTs 28 and the dimming device 10. Then, pixel electrodes 24 formed on the planarization film 29 are electrically connected to the TFTs 28 via throughholes 29a, whereby an active matrix substrate is completed. Thereafter, similarly to the production steps of a commonly-used liquid crystal display device, the active matrix substrate and a counter substrate are attached together, and a liquid crystal material to become a liquid crystal layer 23 is injected, whereby the liquid crystal display device 20 having the dimming device 10 internalized therein is completed.

The display system 100B of the present embodiment is also able to perform displaying under either the reflection mode or the transmission mode by switching between the light reflecting state and the light transmitting state of the dimming device 10, and therefore is suitably employed for use in a multitude of scenes and displaying of multiple contents, similarly to the display system 100A shown in FIG. 14.

Furthermore, according to the present embodiment, the dimming device 10 is disposed inside the liquid crystal display device 20, so that the entire display system can be made thinner and lighter-weight. Moreover, since the dimming device 10 is disposed inside the liquid crystal display device 20, parallax can be reduced, whereby display quality can be further improved. In the example shown in FIG. 15, the substrate 21 is not present between the dimming device 10 and the liquid crystal display device 20, and therefore parallax is reduced correspondingly.

Embodiment 3

Figure 16:
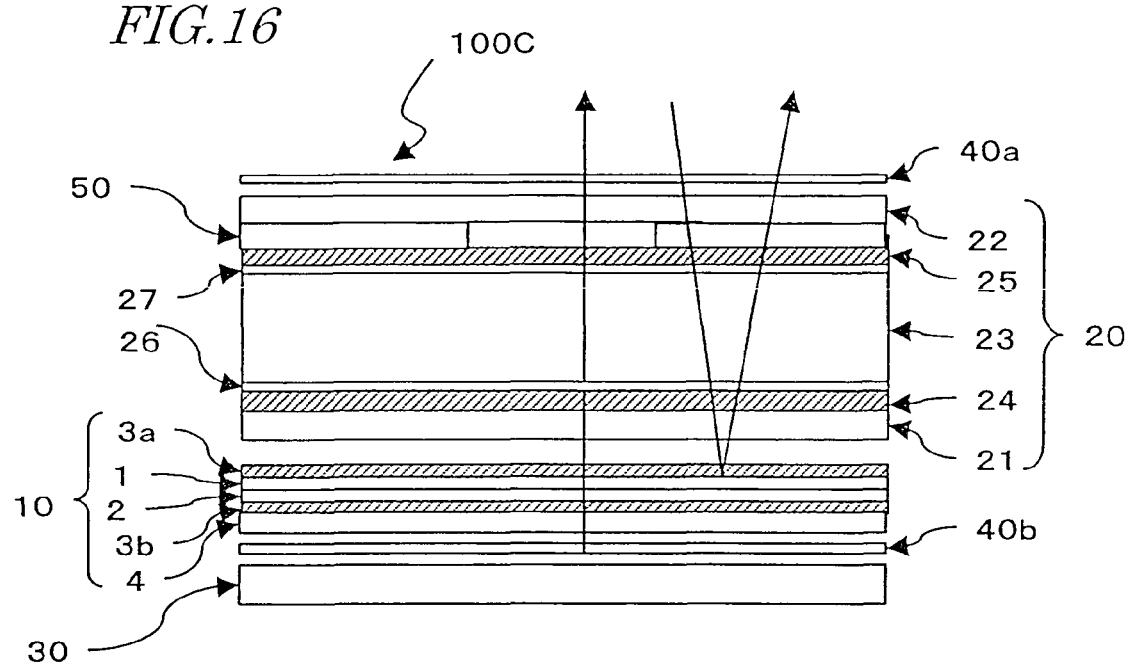
FIG. 16 is a cross-sectional view showing a third embodiment of the display system according to the present invention.
Figure 17:
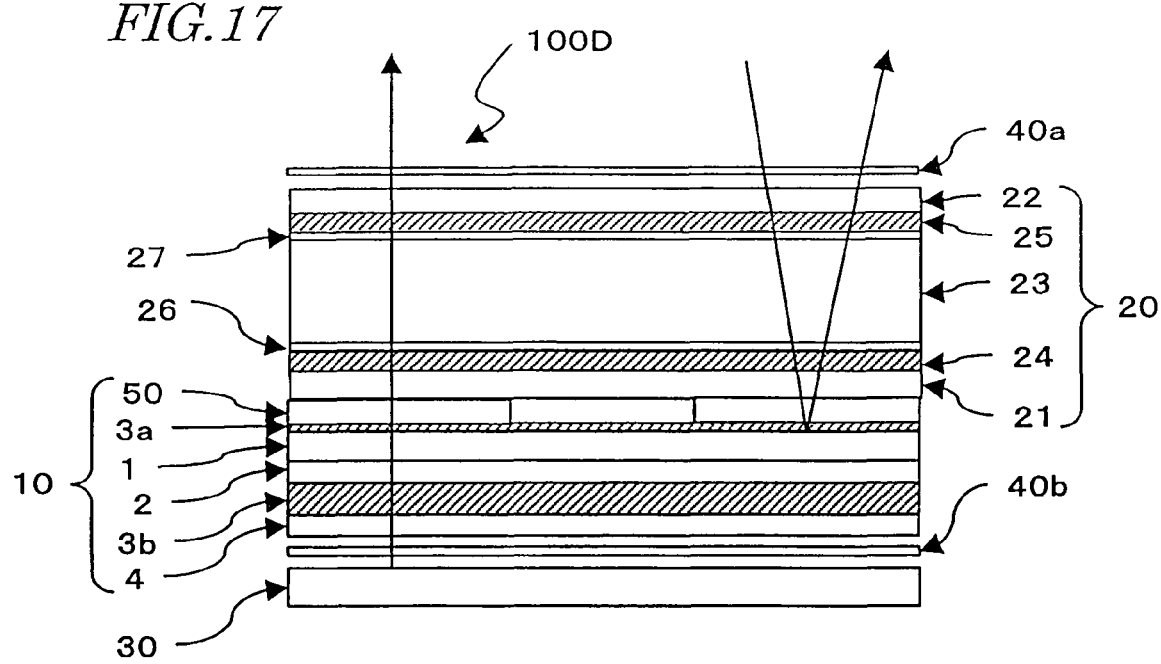
FIG. 17 is a cross-sectional view showing a third embodiment of the display system according to the present invention.
Figure 18:
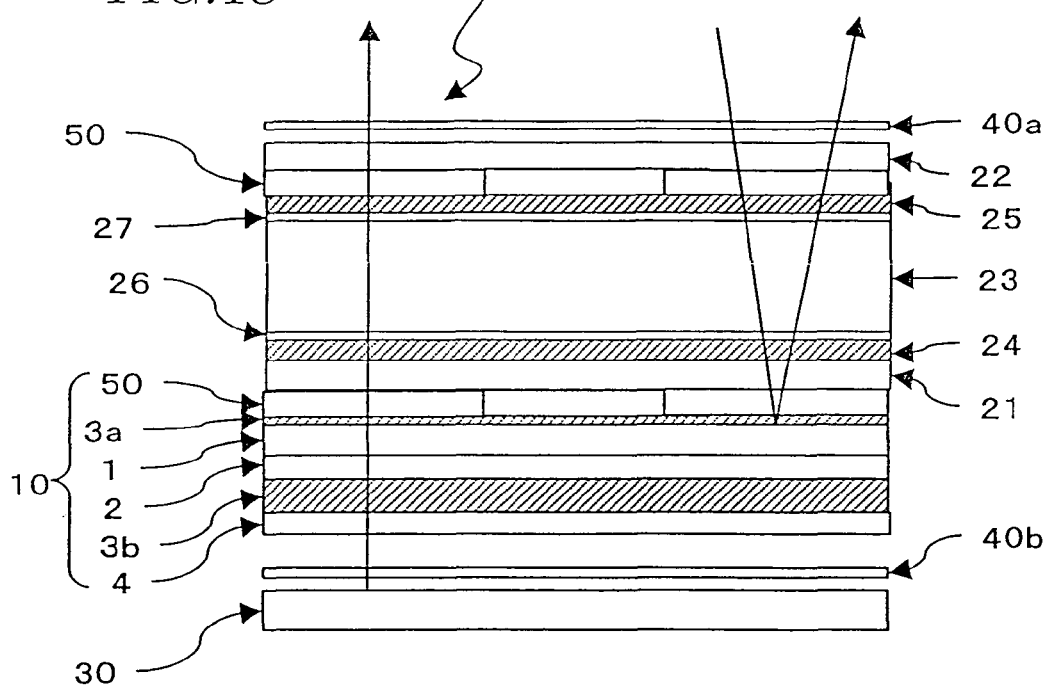
FIG. 18 is a cross-sectional view showing a third embodiment of the display system according to the present invention.

With reference to FIG. 16, FIG. 17, and FIG. 18, third embodiments of the display system according to the present invention will be described.

Display systems 100C, 100D, and 100E according to the present embodiment each include color filters, and therefore are capable of performing color display. As the dimming device 10 and the liquid crystal display device 20 of the display systems 100C, 100D, and 100E, those similar to their counterparts in the display systems 100A and 100B shown in FIG. 14 and FIG. 15 can be used.

In the display system 100C shown in FIG. 16, the liquid crystal display device 20 includes color filters 50. Specifically, the color filters 50 are formed on the surface of the front-face-side substrate 22 facing the liquid crystal layer 23.

On the other hand, in the display system 100D shown in FIG. 17, the dimming device 10 includes color filters 50. Specifically, the color filters 50 are formed on front-face-side electrodes 3a.

In the display system 100E shown in FIG. 18, both the liquid crystal display device 20 and the dimming device 10 include color filters 50, the color filters 50 being formed on a front-face-side substrate 21 of the liquid crystal display device 20 and front-face-side electrodes 3a of the dimming device 10.

Although differing in the positioning of color filters, the aforementioned display systems 100C, 100D, and 100E are all able to perform color display. In the display system 100E shown in FIG. 18, since both the dimming device 10 and the liquid crystal display device 20 include color filters 50, great coloring effects are provided by the color filters, so that displaying can be performed with good color purity.

Embodiment 4

Figure 19:
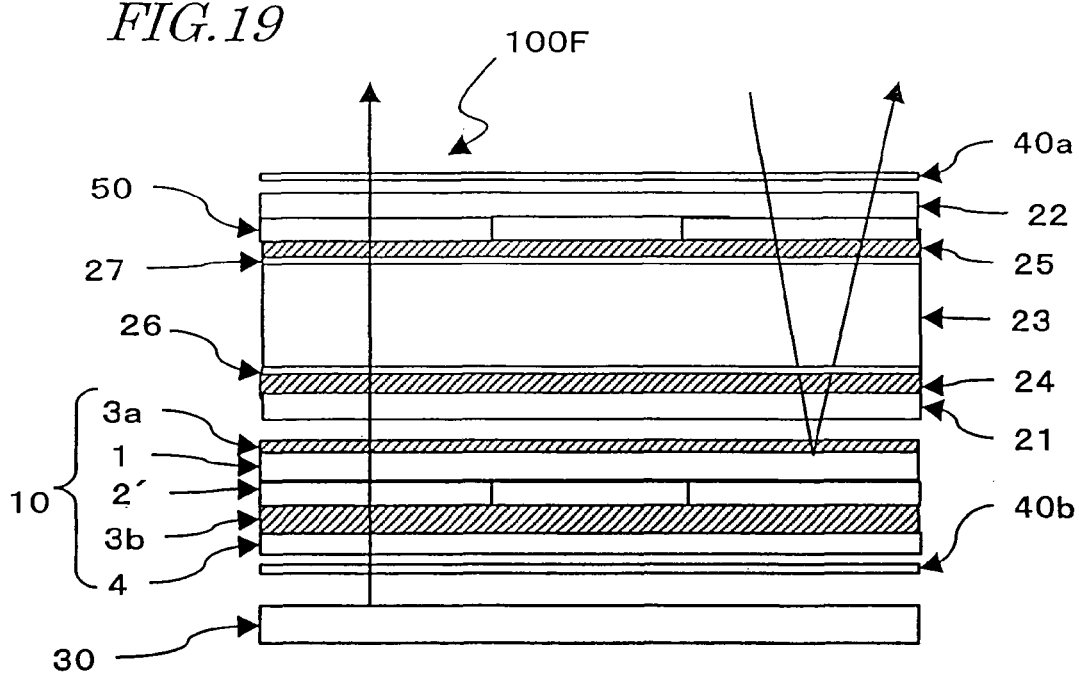
FIG. 19 is a cross-sectional view showing a fourth embodiment of the display system according to the present invention.

With reference to FIG. 19, a fourth embodiment of the display system according to the present invention will be described.

In the display system 100F of the present embodiment, both a liquid crystal display device 20 and a dimming device 10 include color filters. However, in the display system 100E shown in FIG. 18, color filters 50 are formed on front-face-side electrodes 3a. On the other hand, in the present embodiment, a conversion layer 2' of the dimming device 10 also functions as color filters. The conversion layer 2' functioning as color filters is disposed on the opposite side from the viewer with respect to the dimming layer 1.

The conversion layer 2' functioning also as color filters can be formed by, for example, mixing coloring pigments of RGB in the transparent conversion layer described in Embodiment 1. The conversion layer material in which coloring pigments of RGB are mixed can be made into a solution, and therefore an ink jet technique can be used to form the conversion layer 2' in accordance with the pixel pattern. It will be appreciated that, without being limited to an ink jet technique, a screen printing technique or a rolling press technique can also be used for the formation.

According to the present embodiment, the color filters 50 are provided on the liquid crystal display device 20, while the conversion layer 2' on the rear face side of the dimming layer 1 also functions as color filters. As a result, as shown in FIG. 19, light travels through the color filters twice (i.e., once through the color filters 50 and once through the conversion layer 2') when performing display under the transmission mode, and travels through the color filters also twice (i.e., twice through the color filters 50) when performing display under the reflection mode. In other words, the number of times that light travels through the color filters is the same between the reflection mode and the transmission mode. Therefore, similar colorations can be obtained between displaying under the reflection mode and displaying under the transmission mode, thus further improving the display quality.

On the other hand, in the display systems 100C, 100D, and 100E shown in FIG. 16, FIG. 17, and FIG. 18, the number of times that light travels through the color filters differs between the reflection mode and the transmission mode, such that the number of times that light travels through the color filters is twice as large under the reflection mode as under the transmission mode. Therefore, if the colors of the color filters are prescribed so that optimum coloration will be obtained under the transmission mode, the display will be dark under the reflection mode. Conversely, if the colors of the color filters are prescribed so that optimum coloration will be obtained under the reflection mode, then the colors will become weak under the transmission mode.

In the display system 100F, during display under the reflection mode, light travels twice through only the color filters 50 of the liquid crystal display device 20. Therefore, coloration under the reflection mode can be optimized by adjusting the colors of the color filters 50. On the other hand, during display under the transmission mode, light travels once through the color filters 50 of the liquid crystal display device 20 and once through the color filters (conversion layer 2') of the dimming device 10. Therefore, by adjusting the colors of the conversion layer 2' while prescribing the color filters 50 so that optimum coloration will be obtained under the reflection mode, the coloration under the transmission mode can also be optimized.

(Other Dimming Devices)

In the above description, a dimming device having as a dimming layer a thin film containing a dimming material was illustrated. However, a dimming device of a type in which a dimming material is made into particle can also be used.

Figure 20:
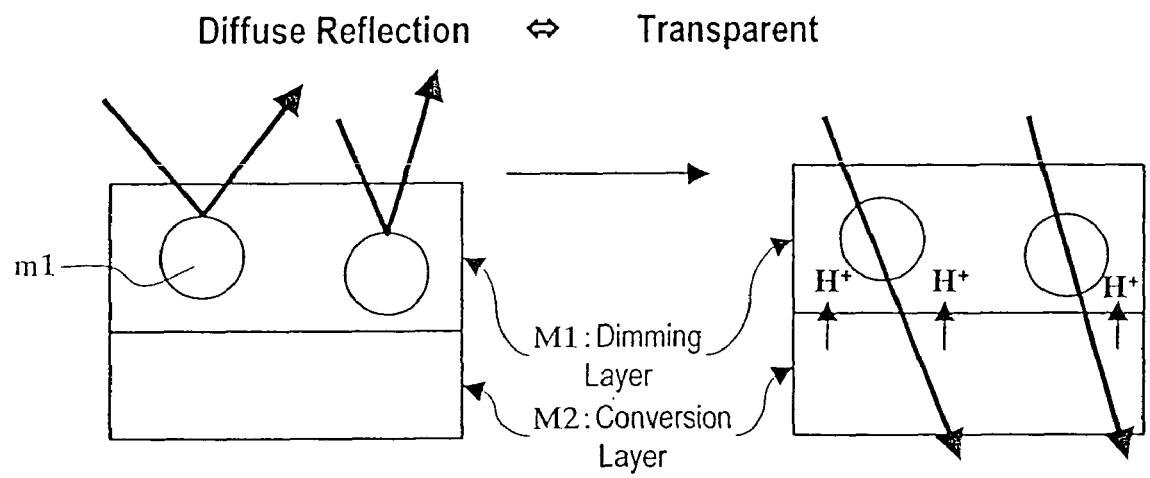
FIG. 20 is a cross-sectional view schematically showing the constitution of a dimming device containing dimming particles.

With reference to FIG. 20, the fundamental constitution of this type of dimming device will be described. As shown in FIG. 20, this dimming device has a layered structure including a dimming layer M1 and a conversion layer M2, such that the light reflectance of the dimming layer M1 changes in response to external stimulations.

The dimming layer M1 contains particles m1 (which may hereinafter be referred to as "dimming particles") of a dimming material whose optical characteristics change in accordance with the concentration of a specific element. Preferable examples of the dimming material are Y, La, and $Mg_2Ni$ alloy as described above. Materials such as Y, La, and $Mg_2N$ alloy undergo transitions between metal and semiconductor (or insulator) states in accordance with hydrogen concentration. The dimming layer M1 contains a binder resin, for example, and the aforementioned dimming particles m1 are dispersed within the binder resin. Moreover, the dimming layer M1 contains an electrolytic material (e.g., a conductive polymer) for transporting hydrogen ions or hydrogen from the conversion layer M2.

The conversion layer M2 contains a conversion material capable of containing a specific element such as hydrogen. The conversion material releases or absorbs the aforementioned specific element (e.g., hydrogen) in accordance with an external stimulation, such as a charge (electrons or holes) injection/release or light irradiation.

This dimming device is also capable of switching between a reflection state and a transparent state, based on the same mechanism as that of the dimming device shown in FIG. 5. However, although the dimming layer M1 contains the dimming particles m1 and each dimming particle m1 mirror-reflects light while in a metallic state, the reflecting direction is random, so that the dimming layer M1 as a whole diffuse-reflects the light. As a result, white reflected light is obtained.

The following advantages are obtained by making the dimming material into particles. The surface area of the dimming material can be made greater than in the case of using a thin film of dimming material as the dimming layer. Therefore, the reaction efficiency between the dimming material and hydrogen is improved, and a rapider switching becomes possible. Since the state of the dimming material contained in the dimming layer can be more surely controlled, the difference in reflectance between a diffuse-reflection state and a transparent state of the dimming layer can be enlarged. As a result, by using this dimming device for a display system, a clearer display is obtained. Furthermore, since light entering the dimming layer is diffuse-reflected in this dimming device, it can be applied to a display system with a particular advantage.

In order for the dimming particles m1 to reflect light, it is desirable that each dimming particle m1 has a grain size greater than the visible light wavelength. Therefore, the dimming particles m1 preferably have a grain size of 350 nm or more, and more preferably 800 nm or more. If it is 800 nm or more, transmission of visible light through the dimming particles m1 can be more surely prevented, so that the light reflectance of the dimming layer M1 can be enhanced. On the other hand, the grain size of the dimming particles m1 is preferably smaller than the thickness of the dimming layer M1. If the grain size is greater than the thickness of the dimming layer M1, the aforementioned advantage associated with making the dimming material into particles cannot be obtained. More preferably, the grain size of the dimming particles m1 is 30 μm or less. Still more preferably, the grain size is 3 μm or less. When the grain size of the dimming material is 1 μm, for example, the dimming layer M1 preferably has a thickness of about 3 μm.

The dimming device having the structure shown in FIG. 20 utilizes a mechanism in which hydrogen ions move between the dimming layer M1 and the conversion layer M2 responsive to charge injection/release as shown in FIGS. 6(a) to (c), but a different mechanism may be adopted. For example, a mechanism where hydrogen ions move between the conversion layer M2 and the dimming layer M1 via electrochemical reactions may be utilized. In this case, the binder resin contained in the dimming layer M1 may be used as a solid electrolyte, or a layer of solid electrolyte may further be provided between the dimming layer M1 and the conversion layer M2. In this case, the conversion material contained in the conversion layer M2 does not need to be a material which stores or releases hydrogen, but may be a material which undergoes a reaction of counterions so as to correspond to the hydrogen ion reaction occurring in the dimming material.

Alternatively, the conversion layer M2 may not be comprised. In this case, a mechanism where hydrogen ions move between the dimming layer M1 and the atmosphere in accordance with the hydrogen pressure in the atmosphere may be utilized. Alternatively, the dimming layer M1 may further contain a conversion material, and hydrogen ions may be moved between the dimming particles m1 and the conversion material inside the dimming layer M1.

Regardless of which mechanism is utilized, the optical characteristics of the dimming layer M1 change in accordance with the hydrogen ion concentration, as shown in FIG. 20.

Note that, among the above, it is preferable to utilize the mechanism in which hydrogen ions are moved based on charge injection/release. In the case where hydrogen is driven by causing the hydrogen equilibrium state to be changed based on movements of charges (electrons or holes), it is unnecessary to involve any ions other than hydrogen ions in the reaction. This leads to an advantage in that the response speed is higher than in the case where a mechanism based on an electrochemical reaction involving a plurality of kinds of ions is utilized. Moreover, since no electrochemical reaction occurs, there is little possibility for hydrogen gas to be generated at the positive side, so that a stable operation is enabled as an electronic device.

Hereinafter, a more specifically constitution of a dimming device containing dimming particles m1 will be described.

Figure 21:
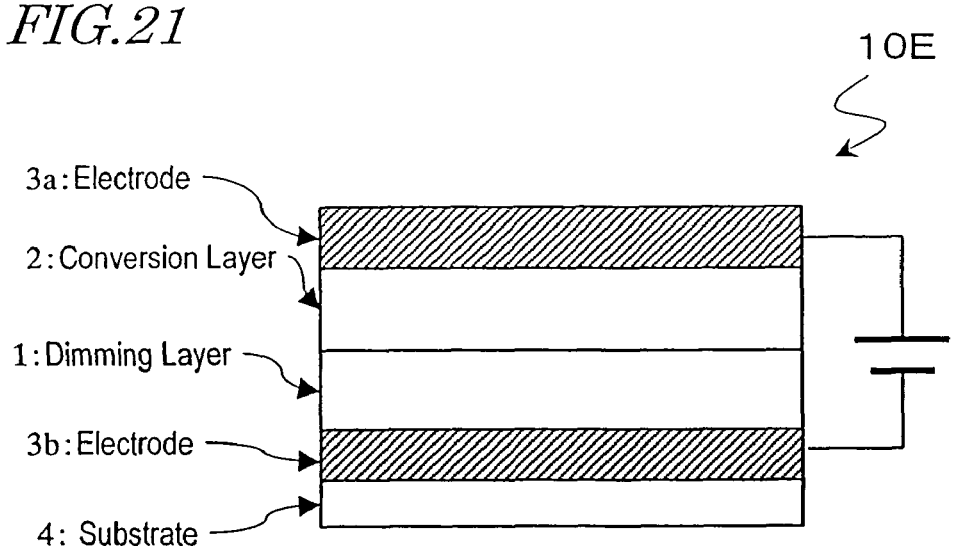
FIG. 21 is a cross-sectional view schematically showing a dimming device containing dimming particles.

The dimming device 10E shown in FIG. 21 has a layered structure including a dimming layer 1 and a conversion layer 2. This layered structure is substantially the same as the structure shown in FIG. 20. The light reflectance (optical characteristics) of the dimming layer 1 changes in response to electrical stimulations. This dimming device 10E comprises a pair of electrodes 3a, 3b sandwiching the dimming layer 1 and the conversion layer 2, and a substrate 4 supporting the layered structure. An appropriate voltage is to be externally applied to the pair of electrodes 3a, 3b. However, the electrode 3a and the electrode 3b may simply be short-circuited as necessary.

Note that the layering order of the conversion layer 2 and the dimming layer 1 with respect to the substrate 4 is not limited to that which is illustrated in the figures, but the conversion layer 2 may be disposed so as to be closer to the substrate 4, with the dimming layer 1 being formed thereupon.

In the dimming layer 10E, microparticles (e.g., yttrium or lanthanum, hereinafter referred to as "dimming microparticles") which have been formed by using a dimming material whose optical characteristics change in accordance with hydrogen concentration are dispersed in a binder resin.

The conversion layer 2 contains a conversion material which is capable of containing hydrogen. This conversion material performs exchanges of electrons with the electrode 3a, thus effecting release/absorption of hydrogen ions (H+).

In the illustrated example, a positive potential is applied to the electrode 3a and a negative potential is applied to the electrode 3b, whereby hydrogen ions are released from the conversion material in the conversion layer 2 containing a sufficient amount of hydrogen in advance. The released hydrogen ions move within an electric field which is generated in the layered structure, and reach the dimming layer 1, thus leaving the dimming microparticles doped therewith. Such a mechanism of hydrogen release and movement is as described above. The dimming material of the dimming microparticles binds to hydrogen, thus forming a hydrogen metal compound. As a result, the dimming microparticles, which were initially in a metallic state, change to a semiconductor or insulator that transmits visible light.

The average grain size of the dimming microparticles contained in the dimming layer 1 is 1 μm, for example. The dimming microparticles are typically dispersed in a binder resin. As a binder resin, an acrylic resin having about the same refractive index as that of glass is used. Moreover, the dimming layer 1 further contains an electrically conductive material for performing exchanges of hydrogen ions and charge between the dimming microparticles and the conversion layer 2. As the electrically conductive material, a material capable of ion transmission, such as a liquid or solid electrolyte, or a conductive polymer (e.g., P2) or a charge transfer complex which transmits charge (electrons or holes) can be used.

The dimming layer 1 can be formed by preparing an application solution by dispersing the aforementioned dimming microparticles in a solution of binder resin, and further dissolving an electrically conductive material therein, and thereafter applying the application solution onto the electrode 3b by a spin coating technique, for example. The thickness of the dimming layer 1 is about 3 μm, for example. The formation of the dimming layer 1 may be performed by an ink jet technique or any other thin film deposition technique. The light incident-side face of the dimming layer 1 may be flat, or have bumps and dents. A dimming layer 1 having bumps and dents can be formed by using a substrate 4 or electrode 3b having bumps and dents and applying the aforementioned application solution onto the under layer having bumps and dents, for example.

The preferable thickness of the dimming layer 1 is no less than 1.5 μm and no more than 50 μm. If it is less than 1.5 μm, it may be impossible to obtain a dimming layer 1 having a high reflectance, or the grain size of the dimming microparticles used in the dimming layer 1 may be limited. On the other hand, if it is greater than 50 μm, the conductivity of the dimming layer 1 may be lowered.

The conversion material contained in the conversion layer 2 is able to store and retain atoms or ions of hydrogen in its stationary state, and changes its hydrogen storage amount (retained amount) in accordance with external stimulations. As this material capable of storing hydrogen, alloys such as $LaNi_5$, $MnNi_5$, $CaNi_5$, $TiMn_{1.5}$, $ZrMn_{1.5}$, $ZrMn_2$, TiNi, TiFe, and $Mg_2Ni$ can be used. Moreover, carbon nanotubes (CNT) may also be used.

The conversion layer 2 may contain an electrically conductive material in addition to the hydrogen storage material. If an electrically conductive material is contained in the conversion layer 2, it is possible to rapidly perform exchanges of hydrogen ions with the dimming layer 1. As an electrically conductive material, a material capable of ion transmission, such as a liquid or solid electrolyte, or a conductive polymer or a charge transfer complex which transmits charge (electrons or holes) can be used. Moreover, in addition to the aforementioned hydrogen storage material or electrically conductive material, a binding material such as a binder resin may be added to the conversion layer 2 as necessary. Note that, in order to surely restrain the charge which has been injected from one electrode from immediately moving to the other electrode, a separator layer may be inserted between the dimming layer and the conversion layer. As the material of the separator layer, it is desirable to choose a material which permits ion movement but is unlikely to permit charge movement. For example, an ion exchanger, a porous insulator, an ion conductive polymer material or the like can be used. By disposing a separate layer composed of such a material, the charge which has been injected from an electrode is surely prevented from penetrating to the other electrode, whereby the charge movement efficiency between the dimming layer and the conversion layer can be enhanced.

In the case where the conversion layer 2 is composed of a mixture of a plurality of materials, a solution obtained by dissolving such materials in a solvent may be prepared and applied by a spin coating technique or a printing technique, whereby the conversion layer 2 can be easily formed. Such formation of the conversion layer 2 may be performed by an ink jet technique or any other thin film deposition technique.

As described above, in the dimming device 10E, exchanges of charges and ions occur inside the conversion layer 2 responsive to application of a voltage to the electrodes 3a, 3b. As a result, owing to the aforementioned mechanism, hydrogen movement can be induced between the conversion layer 2 and the dimming microparticles. Therefore, for example, by using a dimming layer 1 which is undoped with hydrogen in an initial state and a conversion layer 2 having hydrogen stored in advance, if a voltage as shown in FIG. 20 is applied, hydrogen ions move from the positive side to the negative side, thus making the dimming microparticles doped therewith. In other words, a hydrogen release reaction progresses at the positive side, whereas a combination reaction between hydrogen and a metal progresses at the negative side, whereby a hydrogen metal compound is formed. On the other hand, if a voltage in the opposite direction is applied, a hydrogen movement in the opposite direction occurs. Therefore, by reversing the polarity of the applied voltage, the optical state of the dimming layer 1 can be reversibly switched between metallic luster and transparent.

When only contemplating a movement of the hydrogen stored in the conversion layer 2, the electrodes 3a and the electrodes 3b might be short-circuited outside of the layered structure. Such short-circuiting would be a similar phenomenon to a discharging of a secondary battery, and enable restoration of the internal state of the layered structure to the initial state.

Since the conversion layer 2 and the dimming layer 1 have the ability to retain hydrogen, when voltage application is not performed (when the external circuit is open), no hydrogen movement occurs, so that the optical state of the dimming layer 1 is retained (memory function of the dimming layer). Therefore, by choosing a material having a good hydrogen retaining ability, it becomes possible to retain a dimmed state for a long period of time without consuming power.

Contrary to the above example, a dimming layer 1 doped with hydrogen in advance, and a conversion layer 2 in a state not storing hydrogen may be used. In that case, hydrogen may be moved from the dimming layer 1 to the conversion layer 2 by applying a positive potential to the dimming layer 1 and a negative potential to the conversion layer 2, thus causing a change in the optical state of the dimming material in the dimming layer 1.

In the dimming device 10E, the light reflectance/light transmittance of dimming microparticles can be controlled based on a doping amount of hydrogen. Therefore, by controlling the voltage to be applied to the electrode and application time (e.g., a duty ratio), the light reflectance/light transmittance of the dimming layer 1 can be controlled. By utilizing the memory ability based on hydrogen retaining ability, an appropriate light reflectance/light transmittance can be easily retained.

In appropriately controlling such hydrogen storage/release, it is necessary to pay attention to the hydrogen equilibrium pressure-composition isotherm (PTC characteristic curve), as has been described with reference to FIG. 8 regarding the dimming device 10 shown in FIG. 7.

In the dimming device 10E, too, it is preferable to perform switching operations in the plateau region of the PTC characteristic curve. Moreover, it is desirable that the conversion layer 2 and the dimming layer 1 exhibit substantially similar PTC characteristics. More specifically, as shown in FIG. 8, it is desirable that the ranges of "hydrogen storage amount" of the plateau regions of the PTC characteristic curves of the conversion layer 2 and the dimming layer 1 overlap each other, and that the "hydrogen equilibrium pressure" levels are substantially equal. Moreover, it is more preferable that the hydrogen storage amount range (span) of the plateau region of the PTC characteristic curve of the conversion layer 2 is of a size encompassing the hydrogen storage amount range (span) of the plateau region of the PTC characteristic curve of the dimming layer 1.

FIG. 21 is referred to again. Since the dimming device 10E shown in FIG. 21 performs switching between a metal diffuse reflection state and a transparent state, it is preferable that the entire device has a high transparency. In order to establish a high transparency state, not only the substrate 4 and the electrodes 3a, 3b but also the conversion layer 2 must be formed from a material which has a high transmittance (no absorption) in the entire visible light region. However, a conversion material such as a hydrogen storage material is often a metal or a colored material, and it is difficult to form a conversion layer 2 having a high transparence from a layer of such a conversion material. Therefore, it is preferable to form the conversion layer 2 by mixing microparticles of a conversion material with a transparent material. Specifically, nanoparticles having a grain size equal to or less than the light wavelength are formed from a conversion material, and these nanoparticles may be bound with a binder resin which has a good transparence. A conversion layer 2 thus produced is not only able to exhibit both transparence and hydrogen storing ability, but an increase in the hydrogen absorption/release efficiency can also be expected since the conversion material has an increased surface area because of being made into nanoparticles. An increase in the hydrogen absorption/release efficiency of the conversion material is preferable because the response speed of the dimming operation would be improved. As a conversion material in an ultrafine particle state, a carbon type material (e.g., CNT and fullerene), a potassium-graphite interlayer compound or the like can also be used.

In order to realize exchanges of charges and ions between the dimming layer 1 and the conversion layer 2, it is preferable to dispose a film of conductive polymer P1 between the dimming layer 1 and the conversion layer 2. In addition to a polymer film having a charge moving ability, an electrolyte film may be disposed. By disposing such a film, movement of hydrogen ions becomes likely to occur via the electrolyte, and therefore it is possible to improve the characteristics.

Figure 22:
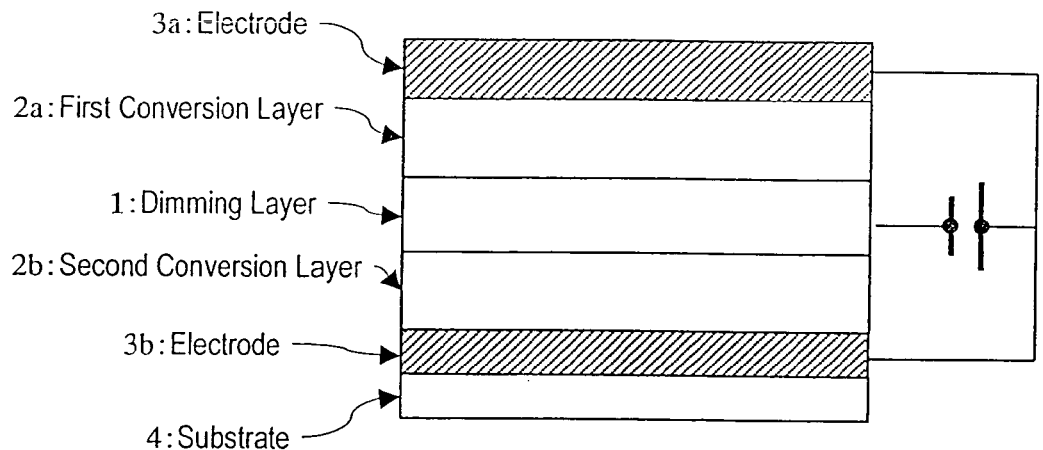
FIGS. 22(a) and (b) are cross-sectional views schematically showing other dimming devices containing dimming particles.
Figure 22:
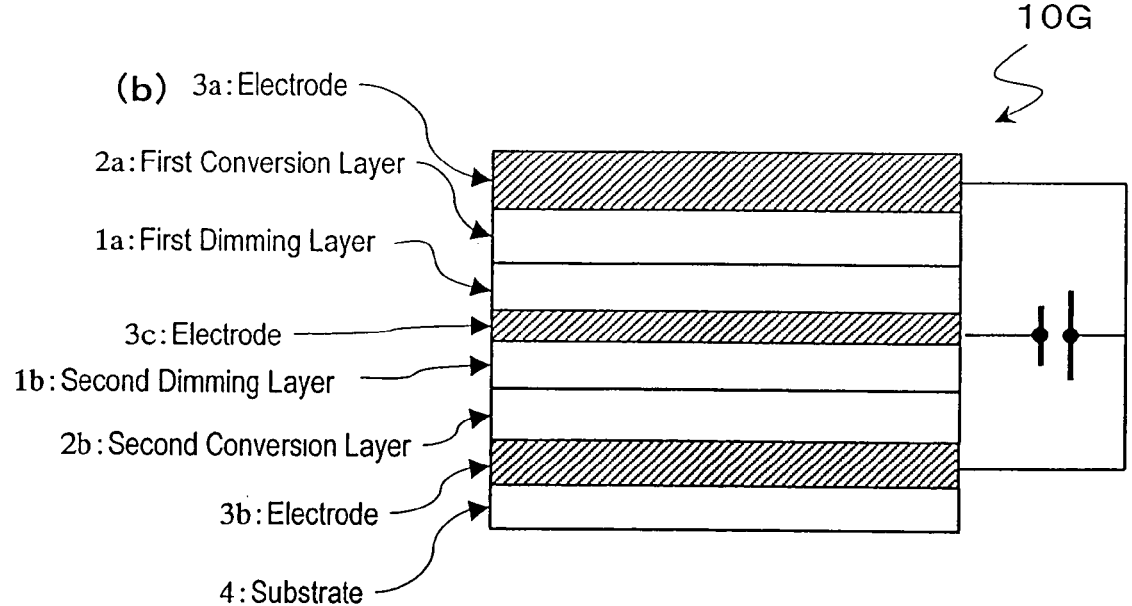

Hereinafter, with reference to FIG. 22 and FIG. 23, other dimming devices 10F, 10G, and 10H of the type containing dimming particles will be described.

The dimming device 10F of FIG. 22(a) has a constitution in which a conversion layer is separated into a plurality of layers, i.e., a first conversion layer 2a and a second conversion layer 2b. In the hitherto-described dimming devices, the dimming layer 1 is doped with a specific element such as hydrogen, whereby the state of the dimming layer 1 is changed. Therefore, by adopting the constitution in which two conversion layers 2a, 2b sandwich the dimming layer 1, efficient doping becomes possible, whereby the speed of the state change necessary for dimming is improved. Since the dimming layer 1 can function as an electrode, the dimming layer 1 is used as an electrode in the example of FIG. 22(a).

In the dimming device of FIG. 22(a), the portion which performs hydrogen absorption/release has a three-layer structure including the first conversion layer 2a, the dimming layer 1, and the second conversion layer 2b, but may have even more layers. Even if sufficient dimming cannot be attained in the case where the dimming layer 1 is of a single layer, it would become possible to attain a sufficient dimming by increasing the number of layers in the dimming layer 1.

In the case where the dimming layer 1 has such a low conductivity that it cannot be used as an electrode, as in a dimming device 10G shown in FIG. 22(b), the dimming layer may be separated into two layers, i.e., a first dimming layer 1a and a second dimming layer 1b, and an electrode 3c may be inserted between these dimming layers. In the dimming device 10G of FIG. 22(b), too, the dimming layer 1 may have even more layers.

The dimming device of either FIG. 22(a) or (b) can be easily produced by sequentially stacking the respective layers. Note that the dimming layer, the conversion layer, the electrodes, and the substrate may have similar constitutions to that of dimming device 10E shown in FIG. 21 except that the number of stacked layers may be different.

Figure 23:
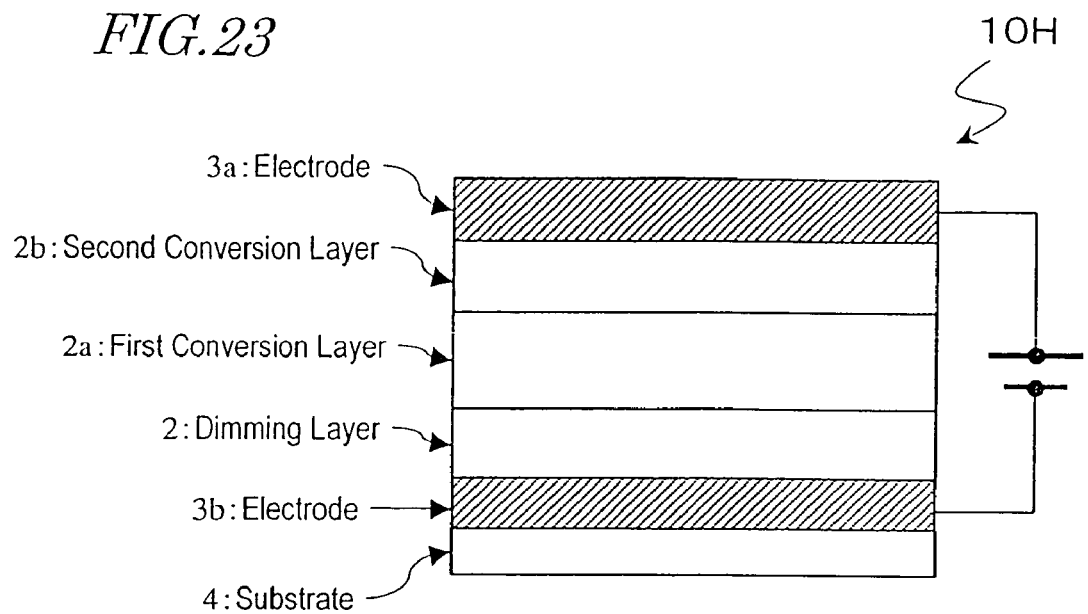
FIG. 23 is a cross-sectional view schematically showing another dimming device containing dimming particles.

In the dimming device 10H shown in FIG. 23, the conversion layer 2 has a multi-layer structure in order to separate the functions of the conversion layer 2. As described above, the functions of the conversion layer 2 are to store hydrogen, and to release/re-store hydrogen in accordance with charge injection/release. Rather than realizing these functions with a single material, it would be easier to select a different material for each function, and stack layers that are composed of the respective materials. In other words, by separating the conversion layer into a first conversion layer 2a composed of a charge transport material or an electrolyte material for performing exchanges of charges or ions and a first conversion layer 2a formed from a material having a hydrogen storing function, efficient hydrogen movement can be realized.

Herein, a charge ion exchange layer formed by mixing a conductive polymer material P1 (a material capable of transporting both charges, i.e., electrons and holes) and an acrylic resin having about the same refractive index as that of glass is used as the first conversion layer 2a. Moreover, a blended resin obtained by mixing ultrafine particles (dispersion center radius: 10 nm) of an Ni alloy, which is an AB5 type Mm hydrogen storage alloy, and an acrylic resin having about the same refractive index as that of glass is used so as to function as the second conversion layer 2b. Note that such separation of functions of the conversion layers can also be applied to any of the dimming devices shown in FIG. 21 and FIG. 22.

As the dimming device to be used in a display system according to the present invention, any dimming device that is capable of switchably presenting a light reflecting state or a light transmitting state can be used, without being limited to those exemplified here. For example, a liquid crystal device comprising a liquid crystal layer composed of a cholesteric liquid crystal material, or a liquid crystal device comprising a liquid crystal layer of a polymer dispersed type may be used as the dimming device. In the cases where such a liquid crystal device is used as the dimming device, too, since the dimming device includes dimming regions and is constructed so as to be able to selectively switch between a light reflecting state and a light transmitting state of each dimming region in accordance with the type of information displayed on the display device, it is possible to perform display in a mode which provides optimum visual recognition depending on each content type. Therefore, the display system can be suitably used for displaying multiple contents.

However, note that those dimming devices which have been described with reference to the figures, which are capable of switching between a metallic reflection state and a transmitting state, are able to provide a high efficiency of light utility (reflectance) because of utilizing a metallic reflection state, and are able to reduce power consumption because of having a memory ability. Therefore, by using such a dimming device, a display system which is particularly suitable for use in a multitude of scenes can be obtained.

On the other hand, by principle, a liquid crystal device using cholesteric liquid crystal can only reflect half of the incident light (either the p wave or the s wave), and reflected light will exist even in a transmitting state, thus resulting in a low efficiency of light utility. A liquid crystal device using a polymer dispersed type liquid crystal does not have a memory ability, and therefore a voltage must always be applied across the liquid crystal layer, thus being disadvantageous in terms of power consumption; and the liquid crystal material in spherical shapes dispersed in the polymer matrix will reflect light under total reflection conditions based on a refractive index difference with respect to the matrix material, and it is therefore impossible to reflect light in all directions. A dimming device utilizing a metallic reflection state is basically able to reflect light from all directions, and therefore has a high efficiency of light utility.

By disposing a dimming device which is able to mirror-reflect light (e.g., that shown in FIG. 7, for example) on the front face of a display device, it becomes possible to use the display system as a piece of interior equipment which serves both as a display and a mirror.

According to the present invention, there is provided a display system which has good display characteristics during both display under the transmission mode and display under the reflection mode, and which is suitable for use in a multitude of scenes and/or displaying of multiple contents.

The invention claimed is:

1. A display system comprising:
a dimming device capable of switchably presenting a light reflecting state or a light transmitting state; and
a display device for performing display by modulating incident light; wherein
the dimming device is a dimming device having a layered structure including a first layer and a second layer, such that a light reflectance of the first layer changes in response to an external stimulation;
the first layer contains a first material whose optical characteristics change in accordance with a concentration of a specific element;
the second layer contains a second material capable of containing the specific element, the second material releasing or absorbing the specific element in accordance with the external stimulation;
the element is hydrogen, and the first material is able to transition between a light reflecting state and a light transmitting state in accordance with a hydrogen concentration;
the second layer contains a hydrogen storage material; and
the display system operates in a region where respective hydrogen equilibrium pressure-composition isotherms (PTC characteristic curves) of the first layer and the second layer are substantially flat.

2. The display system of claim 1, wherein, in the region where the PTC characteristic curves are substantially flat, hydrogen equilibrium pressures of the first layer and the second layer are about the same.

3. The display system of claim 2, wherein a range of hydrogen storage amount of the second layer in the region where the PTC characteristic curve is substantially flat encompasses a range of hydrogen storage amount of the first layer in the region where the PTC characteristic curve is substantially flat.

4. A display system comprising:
a dimming device capable of switchably presenting a light reflecting state or a light transmitting state; and
a display device for performing display by modulating incident light; wherein
the dimming device is a dimming device having a layered structure including a first layer and a second layer, such that a light reflectance of the first layer changes in response to an external stimulation;
the first layer contains a first material whose optical characteristics change in accordance with a concentration of a specific element;
the second layer contains a second material capable of containing the specific element, the second material releasing or absorbing the specific element in accordance with the external stimulation; and
the second material releases or absorbs the specific element in response to light irradiation.

5. The display system of claim 4, wherein the second layer contains a material having a photocatalytic ability.

6. A display system comprising:
a dimming device capable of switchably presenting a light reflecting state or a light transmitting state; and
a display device for performing display by modulating incident light, wherein,
the dimming device is a dimming device comprising a dimming layer whose light reflectance changes in response to an external stimulation;
the dimming layer contains a first material whose optical characteristics change in accordance with a concentration of a specific element, the first material being particles; and
a diameter of the particles is equal to or greater than 350 nm and equal to or less than a thickness of the dimming layer.

7. The display system of claim 6, wherein the display device performs display by modulating light transmitted through the dimming device and/or light reflected by the dimming device.

8. The display system of claim 6, wherein the first material is able to transition between a light reflecting state and a light transmitting state in accordance with the concentration of the specific element.

9. The display system of claim 8, wherein the dimming layer diffuse-reflects light when the first material is in the light reflecting state.

10. The display system of claim 6, wherein the specific element is hydrogen.

11. The display system of claim 6, further comprising a conversion layer containing a second material capable of containing the specific element, wherein the second material releases or absorbs the specific element in accordance with the external stimulation.

12. The display system of claim 11, wherein the specific element is hydrogen, and the conversion layer contains a hydrogen storage material.

13. The display system of claim 12 operating in a region where respective hydrogen equilibrium pressure-composition isotherms (PTC characteristic curves) of the dimming layer and the conversion layer are substantially flat.

14. The display system of claim 13, wherein, in the region where the PTC characteristic curves are substantially flat, hydrogen equilibrium pressures of the dimming layer and the conversion layer are about the same.

15. The display system of claim 14, wherein a range of hydrogen storage amount of the conversion layer in the region where the PTC characteristic curve is substantially flat encompasses a range of hydrogen storage amount of the dimming layer in the region where the PTC characteristic curve is substantially flat.

16. The display system of claim 6, wherein the second material releases or absorbs the specific element through exchanges of electrons.

17. The display system of claim 6, wherein the second material releases or absorbs the specific element through an electrochemical reaction.

18. The display system of claim 6, comprising a pair of conductive layers for forming an electric field for causing ions of the specific element to move from the second material to the first material, or from the first material to the second material.

19. The display system of claim 18, wherein the dimming layer and the conversion layer are positioned between the pair of conductive layers.

20. The display system of claim 18, wherein the dimming layer has conductivity, and functions as one of the pair of conductive layers.

21. The display system of claim 18, wherein the conversion layer has conductivity, and functions as one of the pair of conductive layers.

22. The display system of claim 6, wherein the conversion layer has a light transmitting ability.

23. The display system of claim 6, wherein at least one of the dimming layer and the conversion layer has a multi-layer structure.

24. The display system of 6, wherein the display device is a liquid crystal display device including a pair of substrates and a liquid crystal layer provided between the pair of substrates.

25. The display system of claim 6, further comprising an illumination device disposed on an opposite side from a viewer with respect to the display device.

26. The display system of claim 25, wherein the dimming device is disposed between the display device and the illumination device.

27. The display system of claim 6, wherein the dimming device is disposed inside the display device.

28. The display system of claim 6, wherein the display device includes a first color filter; the dimming device includes a second color filter; and the second color filter is disposed on an opposite side from a viewer with respect to the dimming layer.

* * * * *